United States Patent
DiFonzo et al.

(10) Patent No.: US 8,770,857 B2
(45) Date of Patent: Jul. 8, 2014

(54) MAGNETIC CONNECTOR WITH OPTICAL SIGNAL PATH

(75) Inventors: John C. DiFonzo, Emerald Hills, CA (US); Chris Ligtenberg, San Carlos, CA (US); Michael Culbert, Monte Sereno, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/621,024

(22) Filed: Sep. 15, 2012

(65) Prior Publication Data

US 2013/0170794 A1   Jul. 4, 2013

Related U.S. Application Data

(60) Continuation of application No. 12/910,141, filed on Oct. 22, 2010, which is a division of application No. 12/241,036, filed on Sep. 30, 2008, now Pat. No. 7,841,776.

(51) Int. Cl.
   *G02B 6/38*   (2006.01)

(52) U.S. Cl.
   USPC ............. 385/57; 385/53; 385/55; 385/56; 385/58; 385/59; 385/60; 385/66; 385/68; 385/73; 385/74; 385/75; 385/76; 385/77; 385/78; 385/84; 385/88; 385/89; 385/92; 385/93; 439/38; 439/39; 439/40

(58) Field of Classification Search
   USPC ............... 385/57, 74; 439/38, 39, 40
   See application file for complete search history.

(56) References Cited

U.S. PATENT DOCUMENTS

| | | |
|---|---|---|
| 2,170,287 A | 8/1939 | Kinnebrew |
| 2,234,982 A | 3/1941 | Ross |
| 2,869,091 A | 1/1959 | Robards |
| 3,144,527 A | 8/1964 | Tolegian |
| 3,363,214 A | 1/1968 | Wright |
| 3,431,428 A | 3/1969 | Valer |
| 3,521,216 A | 7/1970 | Tolegian |
| 3,713,370 A | 1/1973 | Prijn |

(Continued)

FOREIGN PATENT DOCUMENTS

| | | |
|---|---|---|
| CA | 2 122 915 A | 3/1994 |
| DE | 36 22 948 A1 | 1/1988 |

(Continued)

OTHER PUBLICATIONS

European Communication dated Jun. 17, 2013 for EP Patent Application No. 09793068.9, 5 pages.

(Continued)

*Primary Examiner* — Ryan Lepisto
(74) *Attorney, Agent, or Firm* — Kilpatrick Townsend & Stockton LLP

(57) ABSTRACT

Circuits, apparatus, and methods that provide a connector system that can supply both power and data to a mobile computing or other type of device using a single connection. Further examples also provide a power and data adapter that can provide power and data to a mobile computing device using a single cable. Further examples provide an easy disengagement when a cable connected to the connector is pulled. One such example provides a magnetic connector that uncouples without binding when its cord is pulled. Another example prevents power from being provided at a connector insert until the connector insert is placed in a connector receptacle.

19 Claims, 19 Drawing Sheets

(56) References Cited

U.S. PATENT DOCUMENTS

| | | | |
|---|---|---|---|
| 3,786,391 A | 1/1974 | Mathauser | |
| 3,808,577 A | 4/1974 | Mathauser | |
| 3,810,258 A | 5/1974 | Mathauser | |
| 3,868,160 A | 2/1975 | Kersman | |
| 3,877,775 A | 4/1975 | Barlow et al. | |
| 3,972,208 A | 8/1976 | Ferrington | |
| 4,056,252 A | 11/1977 | Simon | |
| 4,211,456 A | 7/1980 | Sears | |
| 4,317,969 A | 3/1982 | Riegler et al. | |
| 4,386,818 A | 6/1983 | Millhimes et al. | |
| 4,406,512 A | 9/1983 | Schell | |
| 4,453,798 A | 6/1984 | Asick et al. | |
| 4,500,881 A | 2/1985 | Beane | |
| 4,580,862 A | 4/1986 | Johnson | |
| 4,597,631 A * | 7/1986 | Flores | 385/53 |
| 4,634,208 A | 1/1987 | Hall et al. | |
| 4,669,791 A | 6/1987 | Savill | |
| 4,712,234 A | 12/1987 | Below et al. | |
| 4,810,202 A | 3/1989 | Nodfelt | |
| 4,844,582 A | 7/1989 | Giannini | |
| 4,861,284 A | 8/1989 | Pauza et al. | |
| 4,917,629 A | 4/1990 | Matsuzaki et al. | |
| 5,109,452 A * | 4/1992 | Selvin et al. | 385/69 |
| 5,242,315 A * | 9/1993 | O'Dea | 439/577 |
| 5,244,415 A | 9/1993 | Marsilio et al. | |
| 5,281,762 A | 1/1994 | Long et al. | |
| 5,346,406 A | 9/1994 | Hoffman et al. | |
| 5,364,292 A | 11/1994 | Bethurum | |
| 5,382,167 A | 1/1995 | Janson, Jr. | |
| 5,382,476 A | 1/1995 | Weiser et al. | |
| 5,667,407 A | 9/1997 | Frommer et al. | |
| 5,696,861 A | 12/1997 | Schimmeyer et al. | |
| 5,704,802 A | 1/1998 | Loudermilk | |
| 5,719,753 A | 2/1998 | Taylor | |
| 5,812,356 A | 9/1998 | O'Connor | |
| 5,823,825 A | 10/1998 | Murphy | |
| 5,829,987 A | 11/1998 | Fritsch et al. | |
| 5,885,100 A | 3/1999 | Talend et al. | |
| 5,906,513 A | 5/1999 | Peterson et al. | |
| 5,921,783 A | 7/1999 | Fritsch et al. | |
| 5,941,729 A | 8/1999 | Sri-Jayantha | |
| 5,954,520 A | 9/1999 | Schmidt | |
| 5,961,351 A | 10/1999 | Wu | |
| 6,007,363 A | 12/1999 | Renk | |
| 6,030,229 A | 2/2000 | Tsutsui | |
| 6,042,385 A | 3/2000 | Watanabe et al. | |
| 6,088,752 A | 7/2000 | Ahern | |
| 6,165,006 A | 12/2000 | Yeh et al. | |
| 6,174,194 B1 | 1/2001 | Bleicher et al. | |
| 6,183,264 B1 | 2/2001 | Harsanyi | |
| 6,210,229 B1 | 4/2001 | Lai | |
| 6,211,581 B1 | 4/2001 | Farrant | |
| 6,217,339 B1 | 4/2001 | Tsubata | |
| 6,219,267 B1 | 4/2001 | Andres | |
| 6,231,392 B1 | 5/2001 | van Woensel | |
| 6,250,931 B1 | 6/2001 | Mendelson | |
| 6,259,170 B1 | 7/2001 | Limoge et al. | |
| 6,267,602 B1 | 7/2001 | Mendelson et al. | |
| 6,287,149 B1 | 9/2001 | Elkhatib et al. | |
| 6,290,530 B1 | 9/2001 | Chang | |
| 6,336,827 B1 | 1/2002 | Akama et al. | |
| 6,340,302 B1 | 1/2002 | Ladd | |
| 6,341,961 B1 | 1/2002 | Juntwait | |
| 6,431,902 B1 | 8/2002 | Yeh | |
| 6,447,343 B1 | 9/2002 | Zhang et al. | |
| 6,457,992 B2 | 10/2002 | Posey et al. | |
| 6,464,509 B1 | 10/2002 | Emberty et al. | |
| 6,466,718 B1 | 10/2002 | Linnell | |
| 6,478,614 B1 | 11/2002 | De'Longhi | |
| 6,485,338 B1 | 11/2002 | Wu | |
| 6,527,570 B1 | 3/2003 | Hartman et al. | |
| 6,528,746 B2 | 3/2003 | DeWitt et al. | |
| 6,545,577 B2 | 4/2003 | Yap | |
| 6,561,815 B1 | 5/2003 | Schmidt | |
| 6,565,363 B2 | 5/2003 | Downing | |
| 6,568,942 B2 | 5/2003 | Lau et al. | |
| 6,595,801 B1 | 7/2003 | Leonard et al. | |
| 6,607,391 B2 | 8/2003 | Mendelson et al. | |
| 6,616,468 B2 | 9/2003 | Sakiyama | |
| 6,617,518 B2 | 9/2003 | Ames et al. | |
| 6,623,276 B2 | 9/2003 | Dalmau Ferrerfabrega et al. | |
| 6,663,415 B2 | 12/2003 | Wu | |
| 6,705,901 B1 | 3/2004 | Lin | |
| 6,706,970 B2 | 3/2004 | Laub et al. | |
| 6,716,043 B2 | 4/2004 | Ishizuka | |
| 6,719,574 B2 | 4/2004 | Grek | |
| 6,727,477 B1 | 4/2004 | Li-Chen | |
| 6,733,333 B1 | 5/2004 | Chen | |
| 6,749,467 B2 | 6/2004 | Korsunsky et al. | |
| 6,773,312 B2 | 8/2004 | Bauer et al. | |
| 6,796,843 B1 | 9/2004 | Ryan et al. | |
| 6,814,626 B2 | 11/2004 | Wen-Yao | |
| 6,821,126 B2 | 11/2004 | Neidlein | |
| 6,846,188 B2 | 1/2005 | Hsin et al. | |
| 6,865,369 B2 | 3/2005 | Semmeling et al. | |
| 6,887,096 B2 | 5/2005 | Matumoto et al. | |
| 6,966,781 B1 | 11/2005 | Bullinger et al. | |
| 6,971,913 B1 | 12/2005 | Chu | |
| 6,976,882 B2 | 12/2005 | Kernan | |
| 6,988,897 B2 | 1/2006 | Belongia et al. | |
| 7,032,288 B2 | 4/2006 | Ladd | |
| 7,112,103 B2 | 9/2006 | Zhang et al. | |
| 7,121,707 B2 | 10/2006 | Currie et al. | |
| 7,186,144 B1 | 3/2007 | Khemakhem et al. | |
| 7,201,613 B2 | 4/2007 | Sasaki | |
| 7,204,695 B1 | 4/2007 | Shiu et al. | |
| 7,217,142 B1 | 5/2007 | Wu | |
| 7,247,046 B1 | 7/2007 | Wu | |
| 7,306,479 B1 | 12/2007 | Wu | |
| 7,311,526 B2 | 12/2007 | Rohrbach et al. | |
| 7,329,128 B1 | 2/2008 | Awad et al. | |
| 7,329,151 B2 | 2/2008 | Wu | |
| 7,332,990 B2 | 2/2008 | Lo et al. | |
| 7,351,066 B2 | 4/2008 | DiFonzo et al. | |
| 7,364,433 B2 | 4/2008 | Neidlein | |
| 7,419,378 B2 | 9/2008 | Ha et al. | |
| 7,429,188 B2 | 9/2008 | Wu | |
| 7,445,452 B1 | 11/2008 | Wu | |
| 7,497,693 B1 | 3/2009 | Wu | |
| 7,498,546 B2 | 3/2009 | Belongia et al. | |
| 7,517,222 B2 | 4/2009 | Rohrbach et al. | |
| 7,540,773 B2 | 6/2009 | Ko | |
| 7,566,224 B2 | 7/2009 | Wu | |
| 7,625,213 B1 | 12/2009 | Tse | |
| 7,632,134 B2 | 12/2009 | Su et al. | |
| 7,645,143 B2 | 1/2010 | Rohrbach et al. | |
| 7,654,856 B2 | 2/2010 | Wu | |
| 7,775,801 B2 | 8/2010 | Shiff et al. | |
| 2001/0031565 A1 | 10/2001 | Sakiyama | |
| 2001/0031582 A1 | 10/2001 | Ushio et al. | |
| 2002/0044746 A1 | 4/2002 | Kronlund et al. | |
| 2002/0054686 A1 | 5/2002 | Tabata et al. | |
| 2003/0148643 A1 | 8/2003 | Yoji | |
| 2004/0067680 A1 | 4/2004 | Wu | |
| 2004/0077187 A1 | 4/2004 | Belongia et al. | |
| 2004/0115988 A1 | 6/2004 | Wu | |
| 2004/0147167 A1 | 7/2004 | Lai | |
| 2004/0184295 A1 | 9/2004 | Robertson et al. | |
| 2004/0209489 A1 | 10/2004 | Clapper | |
| 2004/0224539 A1 | 11/2004 | Boyd et al. | |
| 2005/0082915 A1 | 4/2005 | Steinberg | |
| 2005/0181661 A1 | 8/2005 | Kaneko et al. | |
| 2005/0208783 A1 | 9/2005 | Suzuki et al. | |
| 2005/0255718 A1 | 11/2005 | McLeish | |
| 2005/0255719 A1 | 11/2005 | Heidlein | |
| 2006/0051981 A1 | 3/2006 | Neidlein et al. | |
| 2006/0067690 A1 | 3/2006 | Tatum et al. | |
| 2006/0164447 A1 | 7/2006 | Poole et al. | |
| 2007/0067654 A1 | 3/2007 | Adachi | |
| 2007/0072443 A1* | 3/2007 | Rohrbach et al. | 439/39 |
| 2007/0085516 A1* | 4/2007 | Fenwick et al. | 323/234 |
| 2007/0112989 A1 | 5/2007 | Iwaki | |
| 2007/0184674 A1 | 8/2007 | Koch | |
| 2008/0003868 A1* | 1/2008 | Cairns | 439/552 |

(56) References Cited

U.S. PATENT DOCUMENTS

| 2008/0003881 | A1 | 1/2008 | Wu |
| 2008/0211310 | A1 | 9/2008 | Jitaru et al. |
| 2008/0318476 | A1 | 12/2008 | Weber et al. |
| 2009/0004917 | A1 | 1/2009 | Ice |
| 2009/0142962 | A1 | 6/2009 | Zhang |

FOREIGN PATENT DOCUMENTS

| DE | 3743499 | C1 | 12/1988 |
| DE | 198 20 691 | A1 | 2/1999 |
| DE | 102 42 645 | A1 | 3/2004 |
| DE | 103 33 403 | A1 | 9/2004 |
| EP | 0 112 019 | A1 | 6/1984 |
| EP | 0 282 194 | A1 | 9/1988 |
| EP | 0 289 208 | A2 | 11/1988 |
| FR | 2 566 195 | A1 | 12/1985 |
| FR | 2 685 981 | A1 | 7/1993 |
| GB | 2 174 556 | A | 11/1986 |
| GB | 2 383 476 | A | 6/2003 |
| JP | 03-059973 | A | 3/1991 |
| JP | 05-335051 | A | 12/1993 |
| JP | 7-006817 | A | 1/1995 |
| JP | 11-144803 | A | 5/1999 |
| JP | 11-273770 | A | 10/1999 |
| JP | 2000-12145 | A | 1/2000 |
| JP | 2000-30806 | A | 1/2000 |
| JP | 2000-227529 | A | 8/2000 |
| JP | 2001-167836 | A | 6/2001 |
| JP | 2002-056929 | A | 2/2002 |
| JP | 2002-367724 | A | 12/2002 |
| JP | 2004-206973 | A | 7/2004 |
| JP | 2004-325783 | A | 11/2004 |
| JP | 2005-085568 | A | 3/2005 |
| JP | 2007-294208 | A | 11/2007 |
| JP | 2008-135408 | A | 6/2008 |
| JP | 2009-179137 | A | 8/2009 |
| TW | M260910 | | 4/2005 |
| TW | M264732 | | 5/2005 |
| TW | M266589 | | 6/2005 |
| WO | 95/06970 | A1 | 3/1995 |
| WO | 2004/095647 | A1 | 11/2004 |
| WO | 2007-037807 | A1 | 4/2007 |

OTHER PUBLICATIONS

Japanese Office Action mailed on Jul. 8, 2013 for JP Patent Application No. 2011-529317, 4 pages.
English Abstract of JP2002056929 to Zojirushi Corp, obtained from http://esp@cenet.com, 1-pg.
"Zojirushi Hot Water Dispensing Pot Review," obtained from http://www.pkshiu.com/lof/archive/2005/01/zojirushi-hot-water-dispensing-- pot-review, dated Jan. 5, 2005.
CNN.com, "Break-away cord aims to make deep fryers safer," obtained from http://archives.cnn.com/2001/US/07/03/deep.fryers/, dated Jul. 4, 2001, 2-pgs.
U.S. Consumer Product Safety Commission, "Consumer Product Safety Review," Winter 2002, vol. 6, No. 3, total of 12-pgs., see p. 5.
Dowell Trading Co, Ltd., "News for Break Away Power Cords on Electric Deep Fryers," copyright 2002, 1-pg.
National Presto Industries, Inc., "Magnetic Cord for Electric Deep Fryers," obtained from http://www.gopresto.com/products/products.php?stock=09982, generated Jan. 18, 2006, 1-pg.
"Presto 9984 Control Master Heat Control with Magnetic Cord," obtained from http://www.cookingandcanning.net/pr99comaheco.html, generated Jan. 18, 2006, 1-pg.
Curtis; "Pinned Optical Connector System,"; IP.com Prior Art Database Technical Disclosure; Feb. 2, 2005; 3 pages.
International Search Report mailed on Feb. 2, 2010 for PCT Patent Application No. PCT/US2009/058619, 4 pages.
Australian Office Action mailed on Mar. 22, 2012 for AU Patent Application No. 2009298735, 2 pages.
European Communication dated Dec. 11, 2012 for EP Patent Application No. 09793068.9, 6 pages.
Japanese Office Action mailed on Sep. 18, 2012 for JP Patent Application No. 2011-529317, 4 pages.
Korean Office Action mailed on May 16, 2012 for KR Patent Application No. 10-2011-7009920, with English Translation, 13 pages.
Korean Notice of Allowance mailed on Mar. 21, 2013 for KR Patent Application No. 10-2011-7009920, 1 page.
Chinese Office Action mailed on May 17, 2013 for CN Patent Application No. 200980147909.7, with English Translation, 15 pages.

* cited by examiner

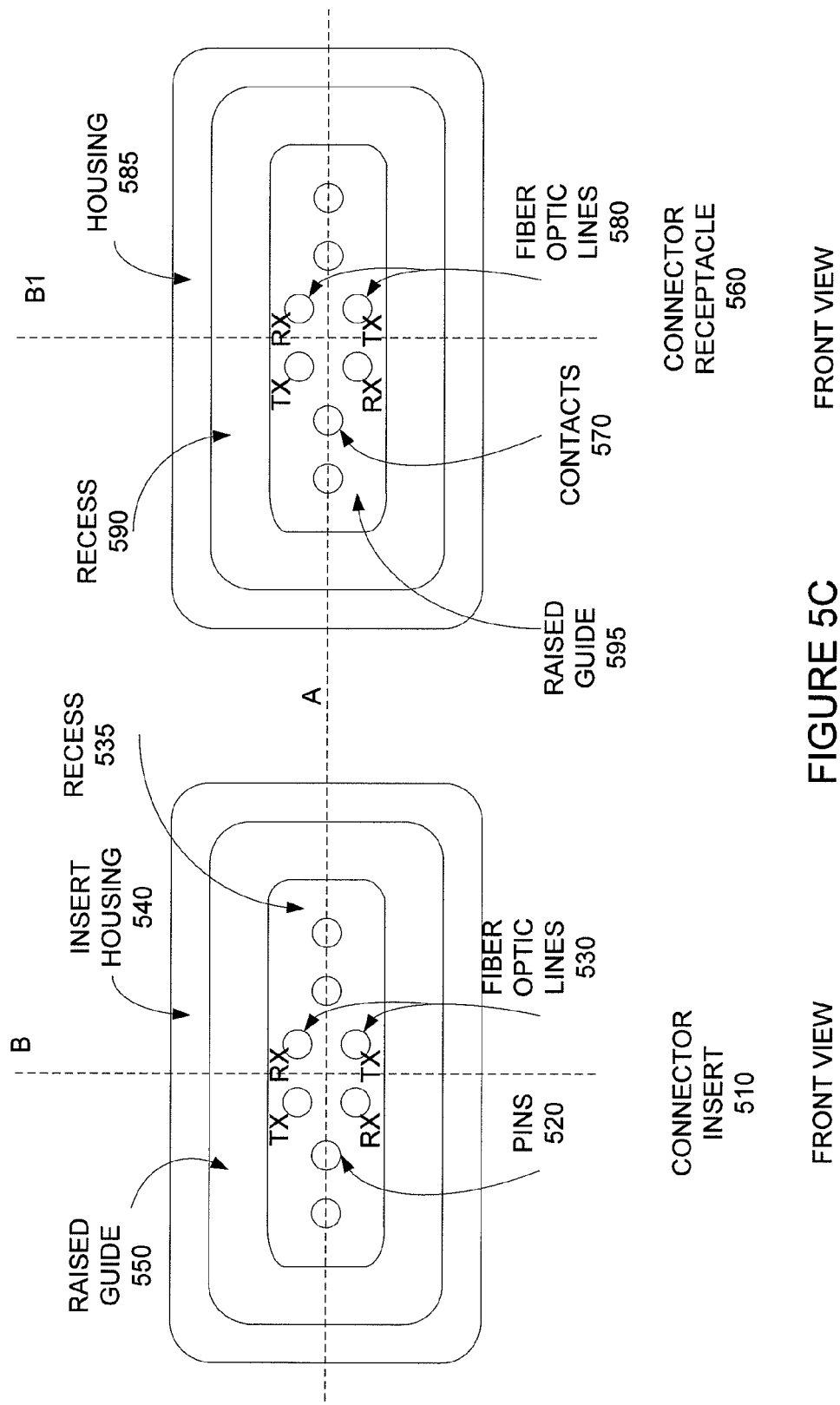

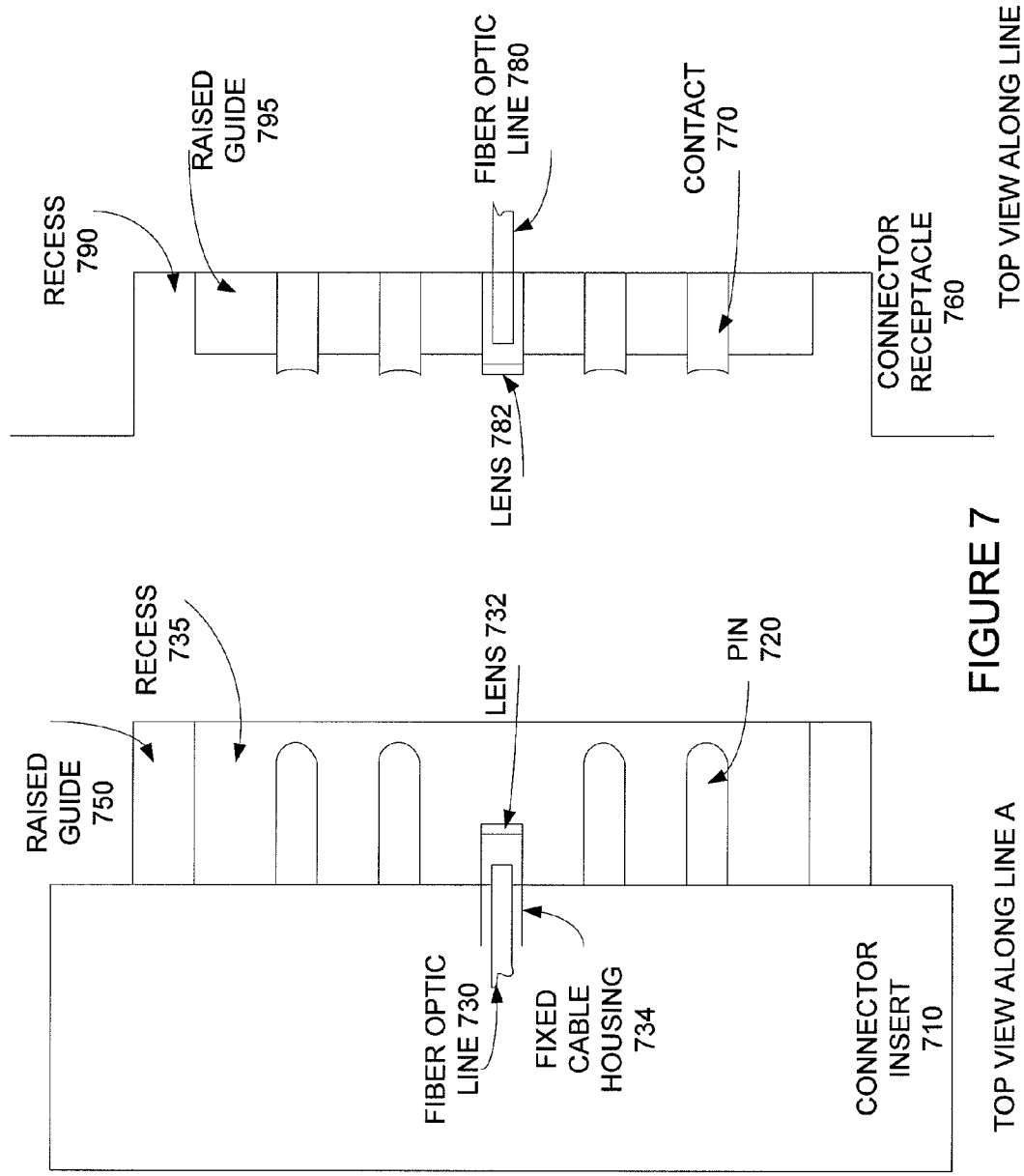

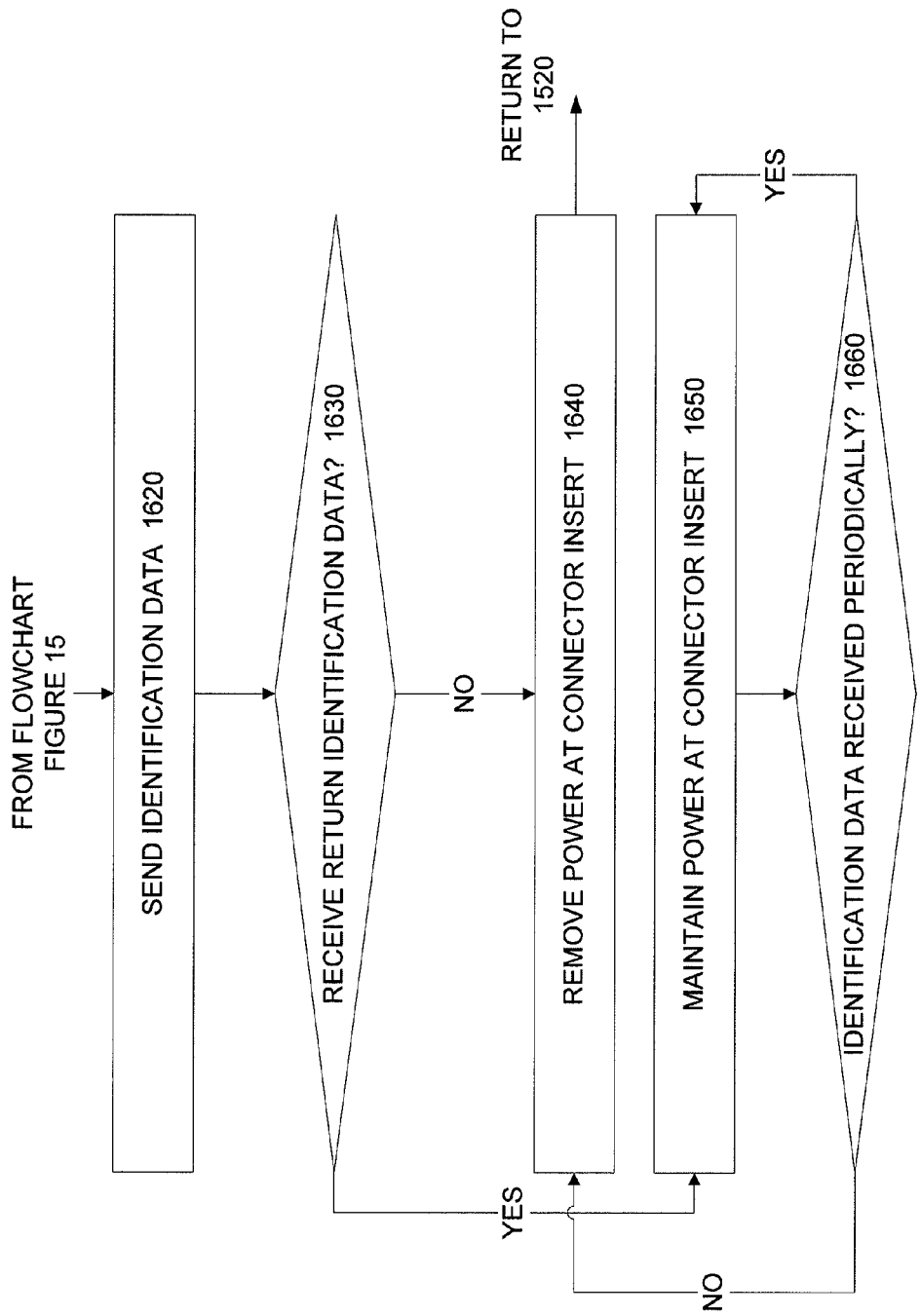

MAGNETIC CONNECTOR WITH OPTICAL SIGNAL PATH

CROSS-REFERENCE TO RELATED APPLICATIONS

This application is a continuation U.S. patent application Ser. No. 12/910,141, filed Oct. 22, 2010, which is a division of U.S. patent application Ser. No. 12/241,036, filed Sep. 30, 2008, now U.S. Pat. No. 7,841,776, the disclosure of which is incorporated by reference herein in its entirety.

BACKGROUND

Mobile computing devices have become very popular the past several years. Users have chosen these devices not only for their portability, they have chosen them to be replacements for their traditional computers as well. These mobile devices thus fill two niches, as on-the-go computing and as desktop replacements. As a desktop replacement, there are two needs that these portable computers must satisfy.

The first of these needs is the ability to function the length of a workday. Unfortunately, this exceeds current battery capacity; thus the laptop needs to be plugged in to a power source for at least a portion of the day. The second need to be satisfied is the ability to transfer data over a physical connection.

Presently, satisfying these two needs requires at least two connections to the mobile device; one for power and one for data transmission. But including two (or more) connectors increases cost and consumes space, typically along the side of the mobile device. It also requires the user to make two separate connections, thus limiting the usefulness and desirability of the mobile computing format.

These two connections also require the use of two cables. This in turn clutters a user's workspace, further degrading the mobile computing experience. Another way that a user's experience can quickly become unpleasant is when the user trips or otherwise becomes entangled with one of these cables, thereby pulling the laptop to the ground.

Thus, what is needed are circuits, apparatus, and methods that provide a power and data transfer system that can supply both power and data to a laptop or other mobile computing device using a single connection. To reduce the clutter caused by multiple cables, it is further desirable to have a power and data adapter that can provide power and data to the mobile computing device using a single cable. It is also desirable to have a connector system that can connect this single cable to the mobile computing device. To avoid the consequence of laptops being pulled to the ground when a cable is tripped over, it is desirable that the connector system easily disengages when the cable is pulled away from the mobile computing device.

SUMMARY

Accordingly, embodiments of the present invention provide circuits, apparatus, and methods for power and data transfer systems that can supply both power and data to mobile computing or other types of devices using a single connection. Further embodiments of the present invention also provide power and data adapters that can provide data and power to mobile computing or other types of devices using a single cable. Further embodiments of the present invention provide connector systems for connecting fiber-optic and power cables to mobile computing or other types of devices. Further embodiments of the present invention provide connector systems with connector inserts that easily disengage from connector receptacles.

An exemplary embodiment of the present invention provides a connector system that provides both power and data. In various embodiments of the present invention, data is provided using fiber-optic connections. These connections may include one, two, four, or other numbers of fiber-optic cables. In a specific embodiment of the present invention, four fiber-optic cables are used, where two cables are used for data transmission and two are used for data reception. In this specific embodiment of the present invention, the four fiber-optic cables are arranged such that the connection between a connector insert and a connector receptacle can be made in two ways along one axis of symmetry. That is, the connector insert can be inserted into the connector receptacle either right side up, or upside down, and the data connection is made using the four fiber-optic cables. This exemplary embodiment of the present invention also employs two, four, or more contacts for power transmission. A specific embodiment of the present invention provides four such contacts, two for a power supply voltage and two for ground connections. This allows relatively high currents to be provided to the mobile device, enabling rapid battery recharging.

Another exemplary embodiment of the present invention provides a connector system that employs one or more magnets to engage a connector insert with a connector receptacle. These one or more magnets are attracted to an attraction plate in the connector receptacle, where the attraction plate is formed using a magnet or a ferromagnetic material. In a specific embodiment of the present invention, the connector insert includes four magnets arranged with alternating polarities. Magnetic field lines originating in a first magnet in the connector insert travel through an attractor plate in the receptacle and terminate in a second magnet in the insert, where the first and second magnets have opposite polarities.

Another exemplary embodiment of the present invention provides a power and data adapter capable of providing power and data over a single cable to a mobile computing or other type of device. In various embodiments of the present invention, this power and data adapter may receive power from a wall, car, or other type outlet. The power and data adapter may directly connect to the outlet, or it may connect to the outlet via a power cord or cable. A specific embodiment of the present invention plugs directly into a wall outlet. In this case, the power and data adapter may also include circuitry for converting AC power to DC power suitable for being provided to the mobile computing or other type of device.

The power and data adapter may translate data between the mobile computing or other type of device and one or more other devices. These one or more other devices may communicate using one or more protocols. The power and data adapter may thus translate or convert data using these one or more protocols to optical data to be provided to the mobile computing or other type of device. The power and data adapter may also translate or convert optical data from the computing or other type of device to data consistent with one or more of these protocols to be provided to one or more other devices. The data may be provided by the power and data adapter to the connector system and received by the power and data adapter from the connector system using one or more fiber-optic cables. The power and data adapter may provide and receive data to and from other devices using fiber-optic cables, or other types of wired or wireless connections such as Local Area Networking (LAN), Universal Serial Bus (USB), Digital Visual Interface (DVI), DisplayPort, IEEE 802.11a, b, g, or other types of connections.

Other devices may communicate with each other through the power and data adapter. For example, two or more USB devices may communicate with each other via a corresponding number of USB connectors on the power and data adapter. The power and data adapter may also include circuitry for translating among these wired and wireless protocols and one or more protocols suitable for fiber-optic communications. The power and data adapter may communicate with the mobile computing or other type of device over a single cable that includes conductors for the DC power and one or more fiber-optic cables.

Another exemplary embodiment of the present invention prevents power from being applied at a connector insert until the connector insert is placed in a connector receptacle. In one embodiment of the present invention, the power and data adapter provides a small amount of current between power and ground pins of the connector insert. A resulting voltage is then sense. If the voltage is in a predetermined range, power is applied to the insert's power pins. In another embodiment of the present invention, an identification or other signal is provided by the connector insert. If a proper response is received, power is applied to the insert's power pins. Further embodiments may require that such an identification signal be periodically provided. When the identification is not received for a period of time, power is removed from the connector insert.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIGS. 5A-5D illustrate front views of connector inserts and a connector receptacles according to embodiments of the present invention;

FIG. 7 illustrates a top view of a connector insert and connector receptacle according to an embodiment of the present invention;

FIGS. 15 and 16 illustrate the operation of the circuitry in FIG. 14.

DESCRIPTION OF EXEMPLARY EMBODIMENTS

Figure 1:
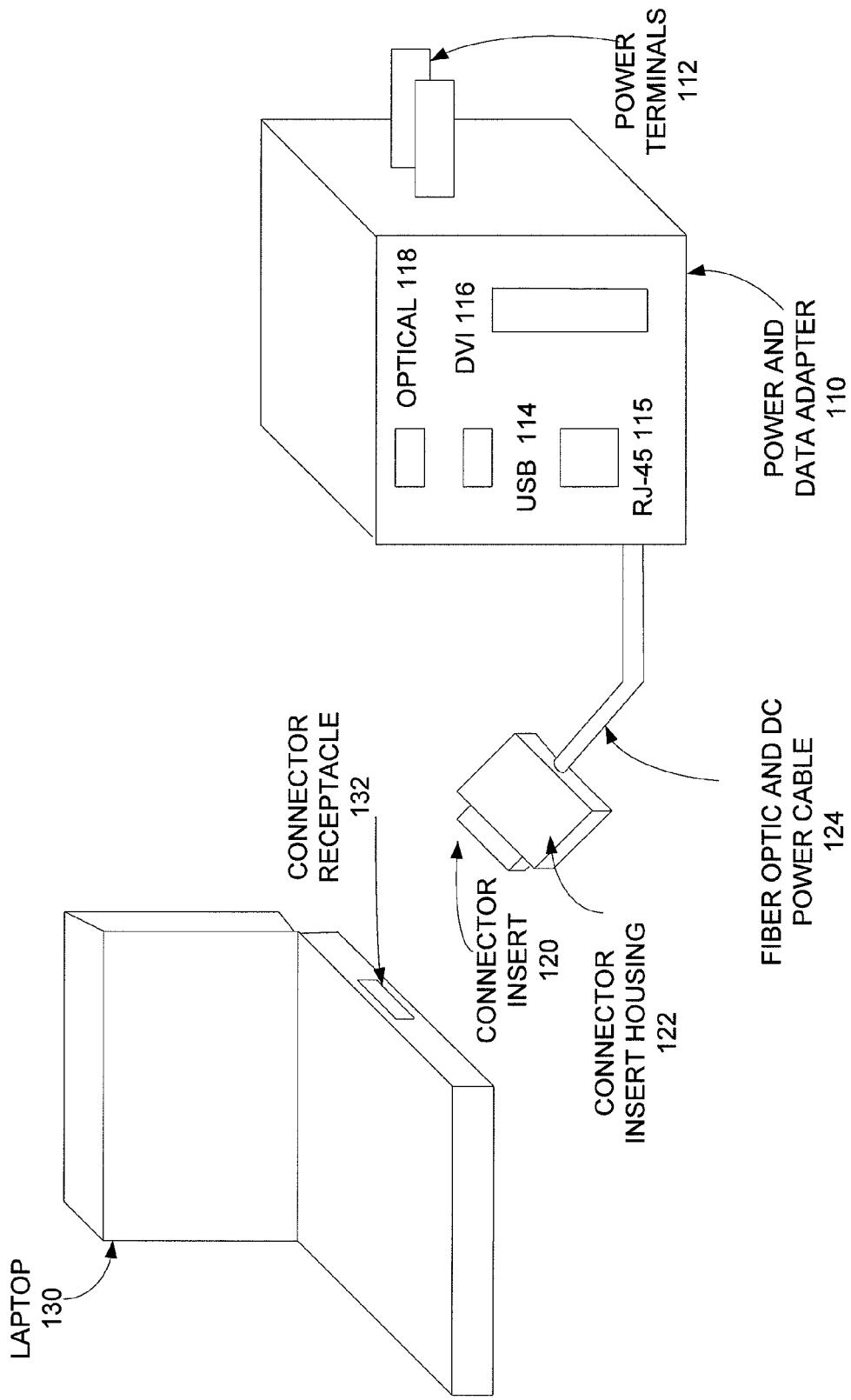
FIG. 1 illustrates a power and data transfer system according to an embodiment of the present invention.

FIG. 1 illustrates a power and data transfer system according to an embodiment of the present invention. This figure includes a power and data adapter 110 and a connector system including a connector receptacle 132 and a connector insert 120 coupled to the power and data adapter 110 via cable 124. This figure, as with the other included figures, is shown for illustrative purposes only and does not limit either the possible embodiments of the present invention or the claims.

The power and data adapter 110 receives a first power supply voltage and provides either the first power supply voltage or a second power supply voltage to the connector insert 120 via the fiber-optic and DC power cable 124. In this specific example, the power and data adapter 110 receives power at power terminals 112. The power terminals 112 may be arranged to receive AC power from a conventional wall socket or other appropriate source. In other embodiments of the present invention, the power and data adapter 110 may receive power from a car outlet or other source.

The power and data adapter 110 may receive and provide data using one or more data connections. In this specific example, the data connections include a USB 114, Ethernet or RJ 45 115, DVI connector 116, and optical connection 118. The optical connection can be an optical connection such as a Sony/Philips Digital Interconnect Format (S/PDIF), optical Ethernet, Fiber Optic Service (FIOS), 100 or 1000 baseFL, or other fiber optic connection. Data received at the data connections is converted to optical data by the power and data adapter 110 and provided to the connector insert 120 via the fiber-optic and DC power cable 124. Data received at the connector insert 120 is received by the power and data adapter 110, again via the fiber-optic and DC power cable 124. The power and data adapter 110 can then convert this data and provide it on the appropriate connector.

The power and data adapter 110 provides DC power and fiber-optic data to the connector insert 120 using the fiber-optic and DC power cable 124. In various embodiments of the present invention, the fiber-optic and DC power cable 124 may be connected to the power and data adapter 110 using a connector system such as the connector insert 120 and connector receptacle 132. In other embodiments of the present invention, the fiber-optic and DC power cable 124 can be hardwired to the power and data adapter 110.

The connector system includes the connector insert 120 and the connector receptacle 132. The connector insert 120 further includes a connector insert or housing 122, which may be held by a user when the connector insert 120 is inserted into the connector receptacle 132. In this specific example, the connector receptacle 132 is located in a laptop 130, though in other embodiments of the present invention, the connector receptacle 132 may be located in other types of mobile or other electronic devices. For example, the connector receptacle 132 may be located in a portable media player, display, cell phone, desktop computer, or other mobile or non-mobile computing or other type of device.

In various embodiments of the present invention, the power and data adapter 110 is capable of determining one or more characteristics of a computer, such as the laptop 130 that it is connected to. These characteristics can be determined by the power and data adapter sensing a voltage at the connector receptacle 132, by reading data stored on the computer, by receiving data from the computer, or in other ways. The characteristics can be power supply requirements, the type of data or format needed by the computer, or other characteristics. After determining these characteristics, the power and data adapter 110 then configures itself to provide the required power and data.

In various embodiments of the present invention, a laptop 130 or other computer is capable of determining one or more characteristics of a power and data adapter, such as the power and data adapter 110. These characteristics can be determined by the laptop sensing a voltage at the connector insert 120, by reading data stored on the power and data adapter 110, by receiving data from the power and data adapter 110, or in other ways. The characteristics can be power supply capabilities, the type of data or format that can be provided by the power and data adapter 110, or other characteristics. After determining these characteristics, the computer can configure itself to make use of the available power and data.

Figure 2:
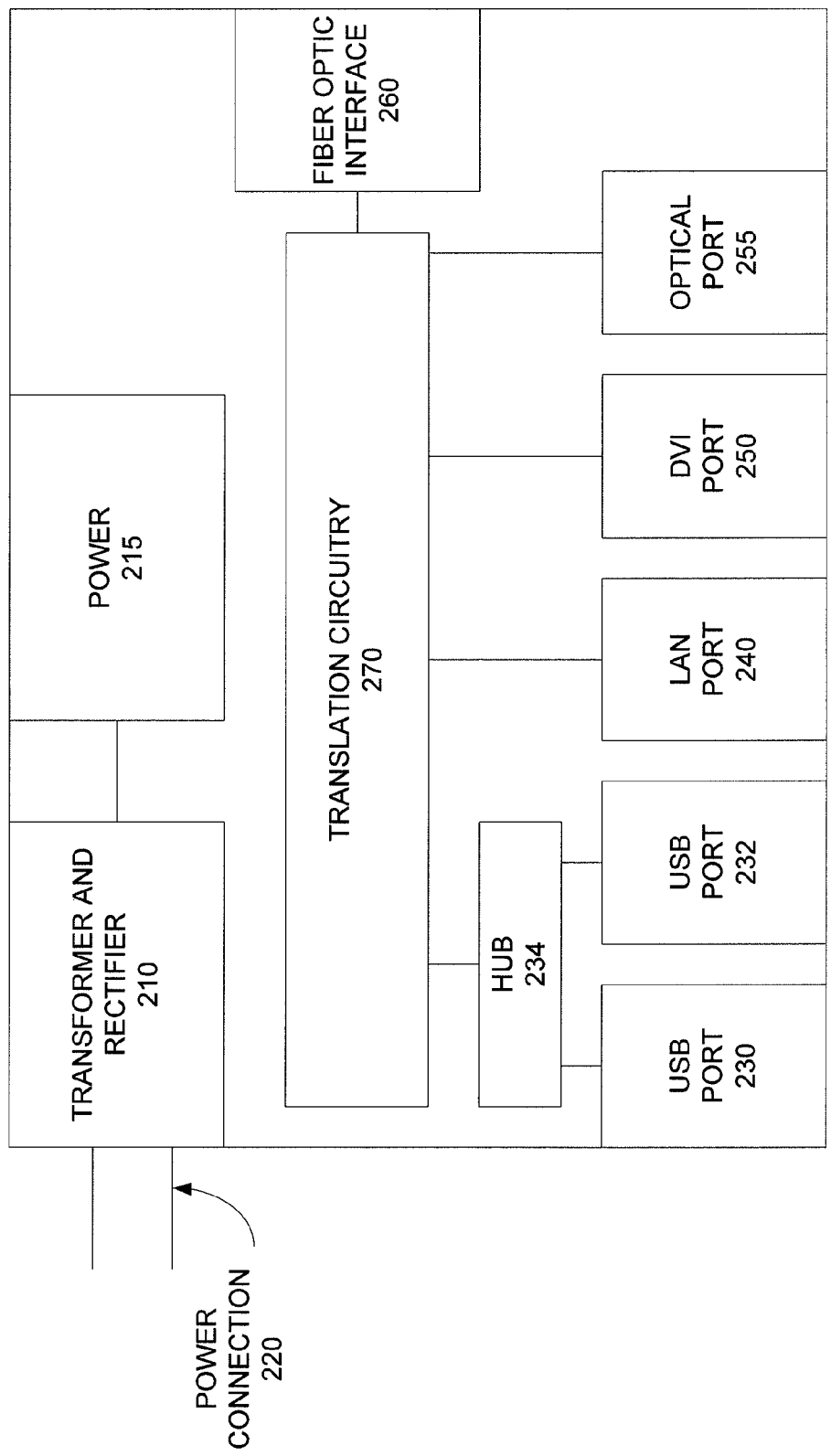
FIG. 2 illustrates circuitry for a power and data adapter according to an embodiment of the present invention.

FIG. 2 illustrates circuitry for a power and data adapter, such as the power and data adapter 110 in FIG. 1 or other power and data adapters consistent with embodiments of the present invention. In this example, a transformer and rectifier 210 receive power from power connection 220. In this example, the power connection 220 may be power prongs configured to be inserted into a conventional wall socket or outlet. The AC power received at the power connection 220 is converted by the transformer and rectifier 210 and provided to a DC power supply circuit 215, which generates regulated DC power supplies that can be provided to a connector insert and to the remaining power and data adapter circuitry.

This example further includes a number of data ports, including USB data ports 230 and 232, local area network port 240, DVI port 250, and optical port 255. In various embodiments of the present invention, fewer, more, and other types of data ports may be included. These ports may be wired electronic data ports, fiber-optic data ports, wireless data ports, or other types of data ports. Data may be received and transmitted at one or more of these ports. Data received at these ports may be translated by translation circuitry 270 into fiber-optic data and provided by the fiber-optic interface 260 to the connector insert. Similarly, data received from the connector insert by the fiber-optic interface 260 can be translated by the translation circuitry 270 and provided to the appropriate data port. In various embodiments of the present invention, one or more of these data ports may communicate with each other. For example, USB data ports 230 and 232 may communicate with each other via hub 234. In this way, the power and data adapter 110 acts as a USB hub, where data can be transferred from one USB port to another or from one USB port to a connector insert via fiber-optic interface 260 and translation circuitry 270.

In various embodiments of the present invention, it is desirable if the power and data adapter does not need to be plugged directly into a wall outlet or other power supply source. In such an example, the power and data adapter may have its own power cable. This allows the power and data adapter to be remotely located from its power source. An example is shown in the following figure.

Figure 3:
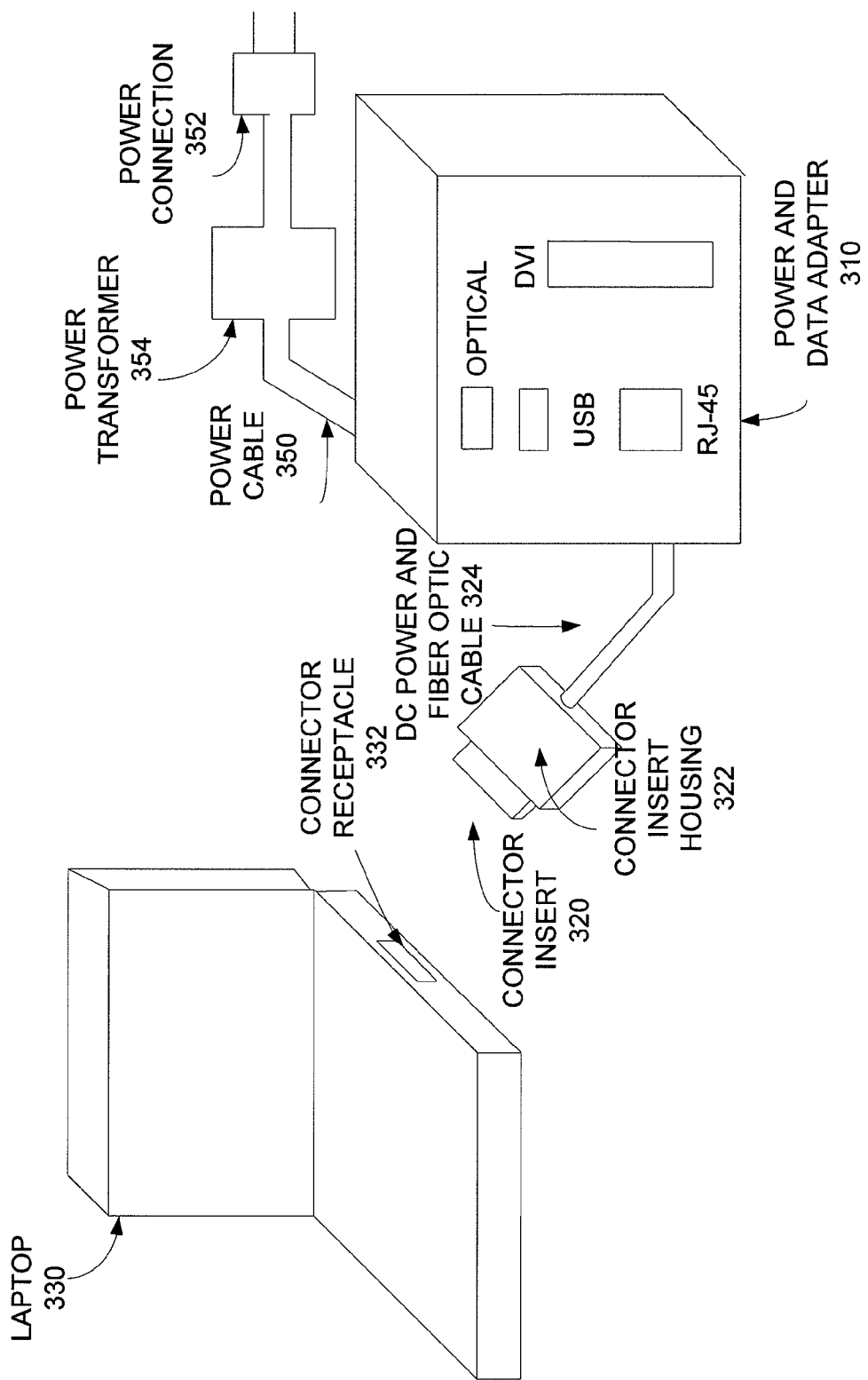
FIG. 3 illustrates another power and data transfer system according to an embodiment of the present invention.

FIG. 3 illustrates another power and data transfer system according to an embodiment of the present invention. This example includes a power and data adapter 310 and a connector system including a connector insert 320 and connector receptacle 332, where the connector insert 320 and power and data adapter 310 are coupled via DC power and fiber-optic cable 324.

In this example, a power cable 350 powers the power and data adapter 310. The power cable 350 includes a power connection 352, which may include prongs adapted to be inserted into a wall socket. A power transformer 354 may convert AC power received at the power connection 352 to DC power for use by the power and data adapter 310. The DC power provided by the power transformer 354 may also be provided to the connector insert 320, though in other embodiments of the present invention, a DC-to-DC converter is used to provide a second DC voltage to the connector insert 320.

In other embodiments of the present invention, it is desirable that the DC power be provided to a connector insert separately from the fiber-optic data. An example is shown in the following figure.

Figure 4:
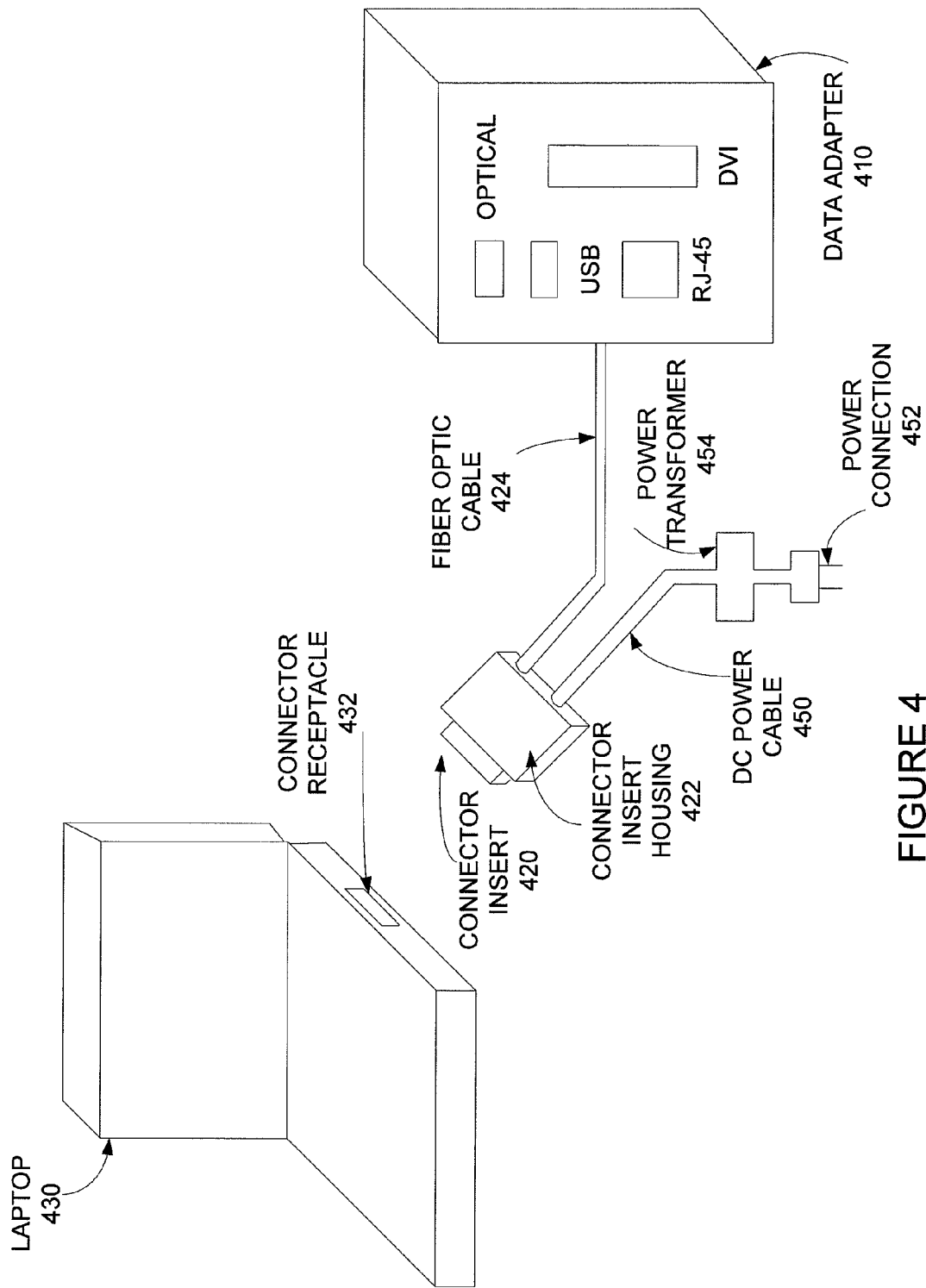
FIG. 4 illustrates another power and data transfer system according to an embodiment of the present invention.

FIG. 4 illustrates another power and data transfer system according to an embodiment of the present invention. This example includes a data adapter 410 and a connector system including a connector insert 420 and connector receptacle 432, where the connector insert 420 and data adapter 410 are coupled together over a fiber-optic cable 424. A separate DC power cable 450 provides DC power to the connector insert 420. The DC power cable 450 has a power connection 450, which may include prongs adapted to fit into a wall outlet. Also included is a power transformer 454, which converts AC power received at the power connection 452 to DC power, which can be provided to the connector insert 420.

Connector systems according to embodiments of the present invention include a connector insert and a connector receptacle that are capable of transferring a power supply, for example, a power supply including a supply voltage and a ground, and a fiber-optic data signal. Various embodiments of the present invention are arranged such that the connector insert is magnetically held in contact with the connector receptacle. These embodiments of the present invention provide a connector insert that is easily disengaged from its receptacle when a cable connected to the connector insert is pulled. Raised guides and corresponding recesses on the insert and receptacle can be used to align the connector insert to the connector receptacle. Examples are shown in the following figures.

Figure 5A:
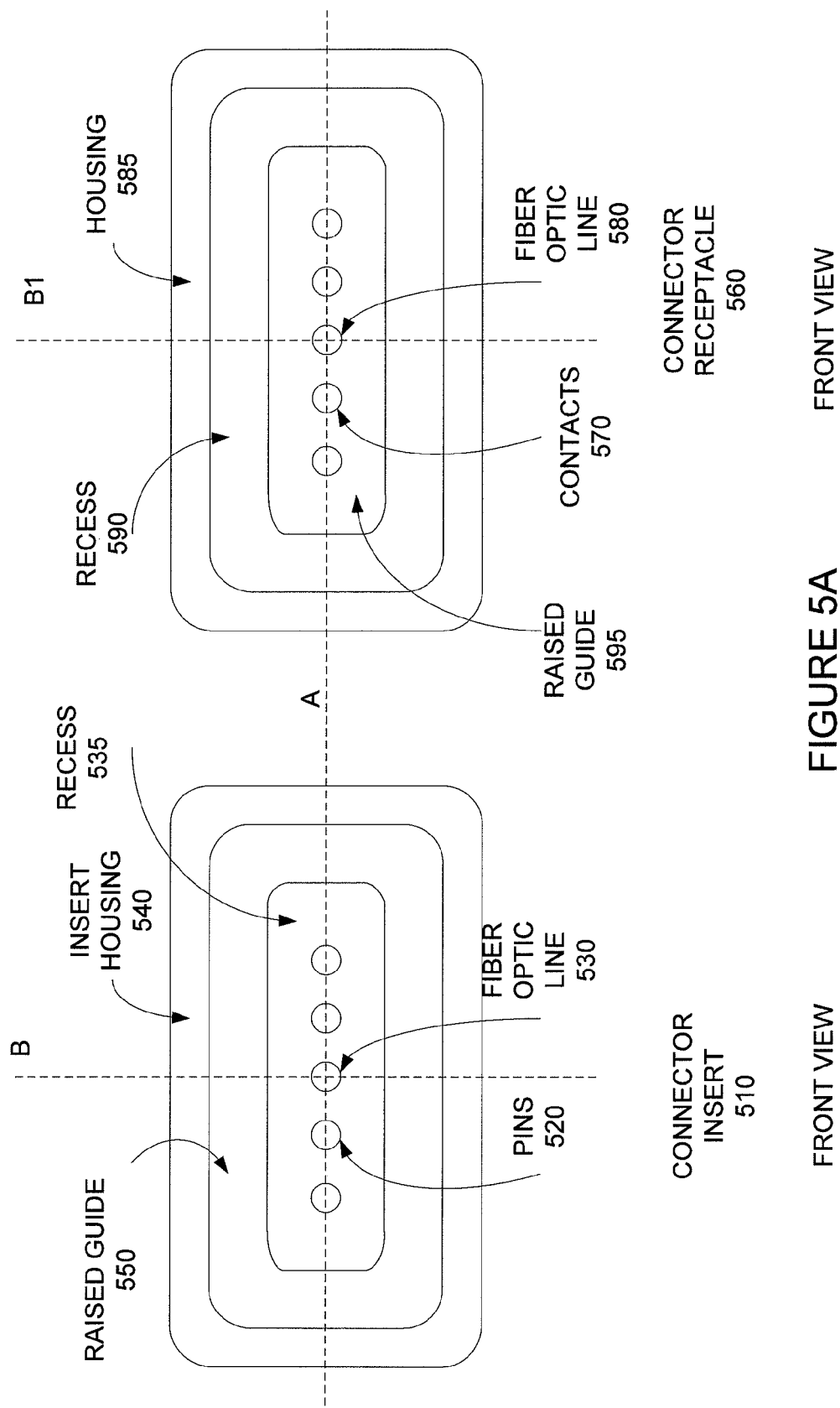

FIGS. 5A-5D illustrate front views of a connector insert 510 and a connector receptacle 560 according to an embodiment of the present invention. While this connector insert 510 and connector receptacle 560 are well suited for use with a power and data adapter according to an embodiment of the present invention, they may be used in other situations not including such a power and data adapter. In FIG. 5A, a single fiber-optic line 530 is used to transfer optical data from the connector insert 510 to the connector receptacle 560. In this example, the connector insert 510 includes a number of pins 520 on each side of the fiber-optic line 530. In other embodiments, pins 520 and one or more fiber-optic lines 530 may have various configurations. In this example, four pins 520 are shown. Two of these pins may be used to provide a positive power supply, while two pins may be used for ground. In other embodiments of the present invention, other power supplies may be provided. The pins 520 and fiber-optic line 530 are located in a recess 535, which is surrounded by a raised guide 550. An insert housing 540 may be employed to protect the raised guide 550.

The connector insert 510 inserts into the connector receptacle 560. The connector receptacle 560 includes a corresponding number of contacts 570 and a fiber-optic line 580. The contacts 570 and fiber-optic line 580 may be on a raised guide 595. A recess 590 may surround the raised guide 595.

The recess may be located in a housing 585, which may be a separate entity or may be a portion of a device such as a laptop computer.

When the connector insert 510 is mated with the connector receptacle 560, the raised guide 550 fits into the recess 590. Similarly, the raised guide 595 fits into the recess 535. This arrangement provides alignment between the connector insert 510 and connector receptacle 560. Also, the connector insert 510 is easily disengaged when a cable connected to the connector insert 510 pulled away from the connector receptacle 560.

In various embodiments of the present invention, the connector insert 510 and connector receptacle 560 are magnetically attracted to each other. This may be accomplished by placing one or more magnets in either the connector insert 510 or connector receptacle 560. In various embodiments of the present invention, one or more magnets are located in the connector insert 510. In a specific embodiment of the present invention, four magnets are placed in the connector insert. Specifically, the raised guide 550 comprises four magnets. These magnets may be generally located in each corner of the connector insert 510. These magnets further may have alternating polarities. In this specific embodiment of the present invention, the connector receptacle 560 includes an attractor plate. Specifically, an attractor plate is located behind recess 590. This attractor plate may be made using a magnet or ferromagnetic material. In this way, field lines originating in one magnet in the connector insert 510 travel through the attraction plate in the connector receptacle 560 to a second magnet having an opposite polarity in the connector insert 510. This increases the magnetic attraction between the connector insert 510 and connector receptacle 560. Further details, for example details pertaining to these magnets, attractor plates, and alignment and disengagement features can be found in U.S. Pat. No. 7,311,526, which is incorporated by reference.

In this example, the connector insert 510 may be inserted into the connector receptacle 560 either right side up or upside down relative to horizontal line "A." Also in this example, only one fiber-optic line is used. In various embodiments of the present invention, data communication is only one way. In such a situation, no more than one fiber-optic line is needed. In other embodiments of the present invention, bidirectional or full-duplex communication is desired. In these situations, either one fiber-optic line may be multiplexed between transmit and receive channels, or other fiber-optic lines may be included. An example is shown in the following figure.

Figure 5B:
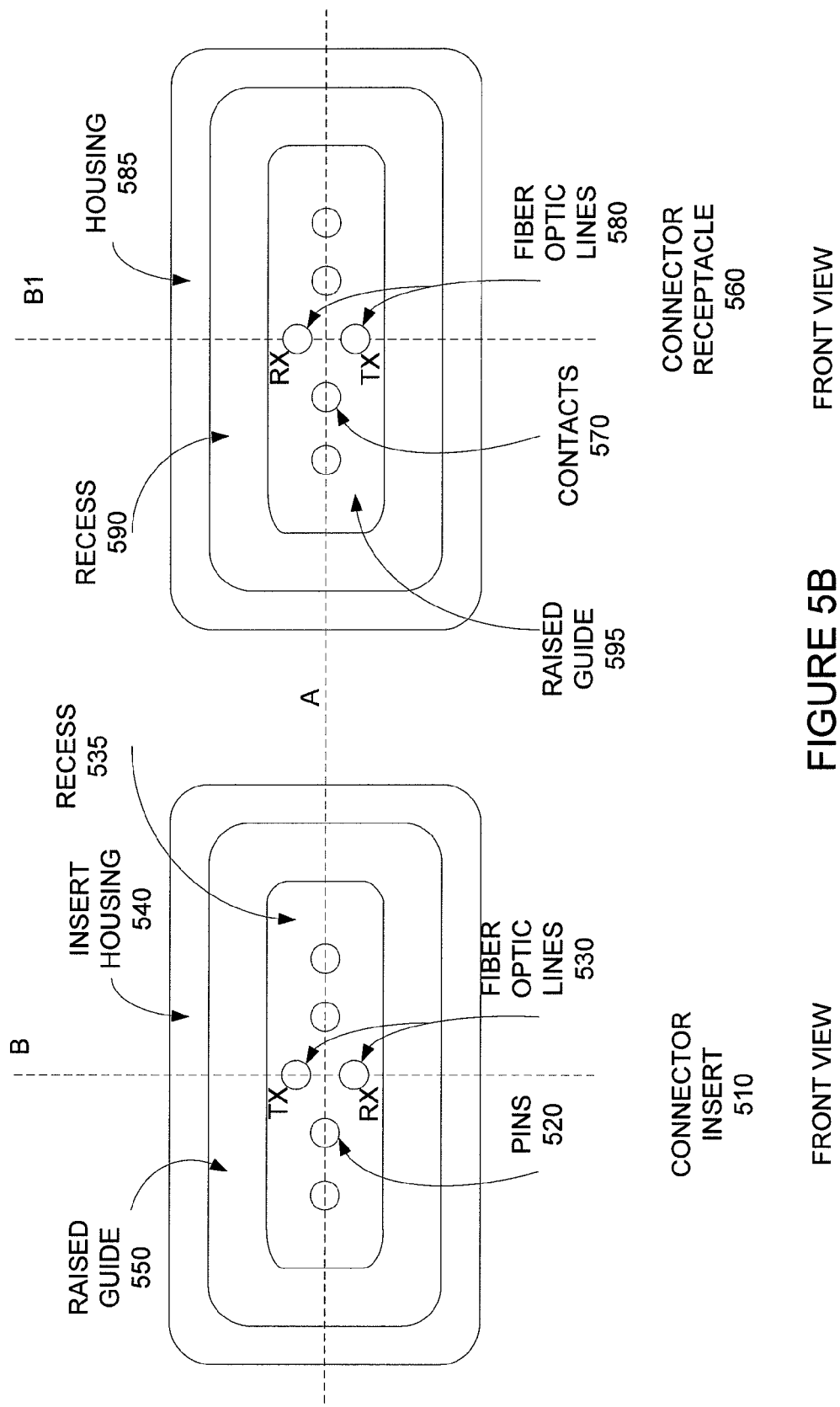

FIG. 5B illustrates front views of a connector insert and connector receptacle according to an embodiment of the present invention. The connector insert 510 in this example includes two fiber-optic lines 530. In this example, one fiber-optic line is used for transmitting and a second is used for receiving. This allows full-duplex communication without having to multiplex signals. Unfortunately, in this configuration, the connector insert 510 can only be placed in the connector receptacle 560 in the right side up orientation. If the connector insert 510 is inserted into the connector receptacle 560 in an upside down position, the fiber-optic transmit channel of the connector insert 510 will be in communication with the transmit channel of the connector receptacle 560. Accordingly, in a specific embodiment of the present invention, the TX and RX fiber optic lines 530 or 560 can be multiplexed, that is, they can be reversed if an upside down insertion is detected. The multiplexing can take place in either the connector insert 510 or the connector receptacle 560. This multiplexing may be performed optically or electrically. To enable upside down insertions and full-duplex communication without the need to multiplex transmit and receive lines, an embodiment of the present invention employs four fiber-optic cables. An example is shown in the following figure.

FIG. 5C illustrates front views of a connector insert and a connector receptacle according to an embodiment of the present invention. The connector insert 510 in this example includes four fiber-optic lines 530. In this example, two lines are used for transmitting and two are used for receiving. The two transmitting and two receiving fiber-optic lines may each be implemented as one split fiber-optic cable. That is, each may be implemented as one fiber-optic cable whose end is split. This allows full-duplex communication without having to multiplex transmit and receive signals. Since the four fiber-optic lines are rotationally symmetrical, the connector insert 510 may be inserted into the connector receptacle 560 in either the right-side up or upside down positions.

Figure 5D:
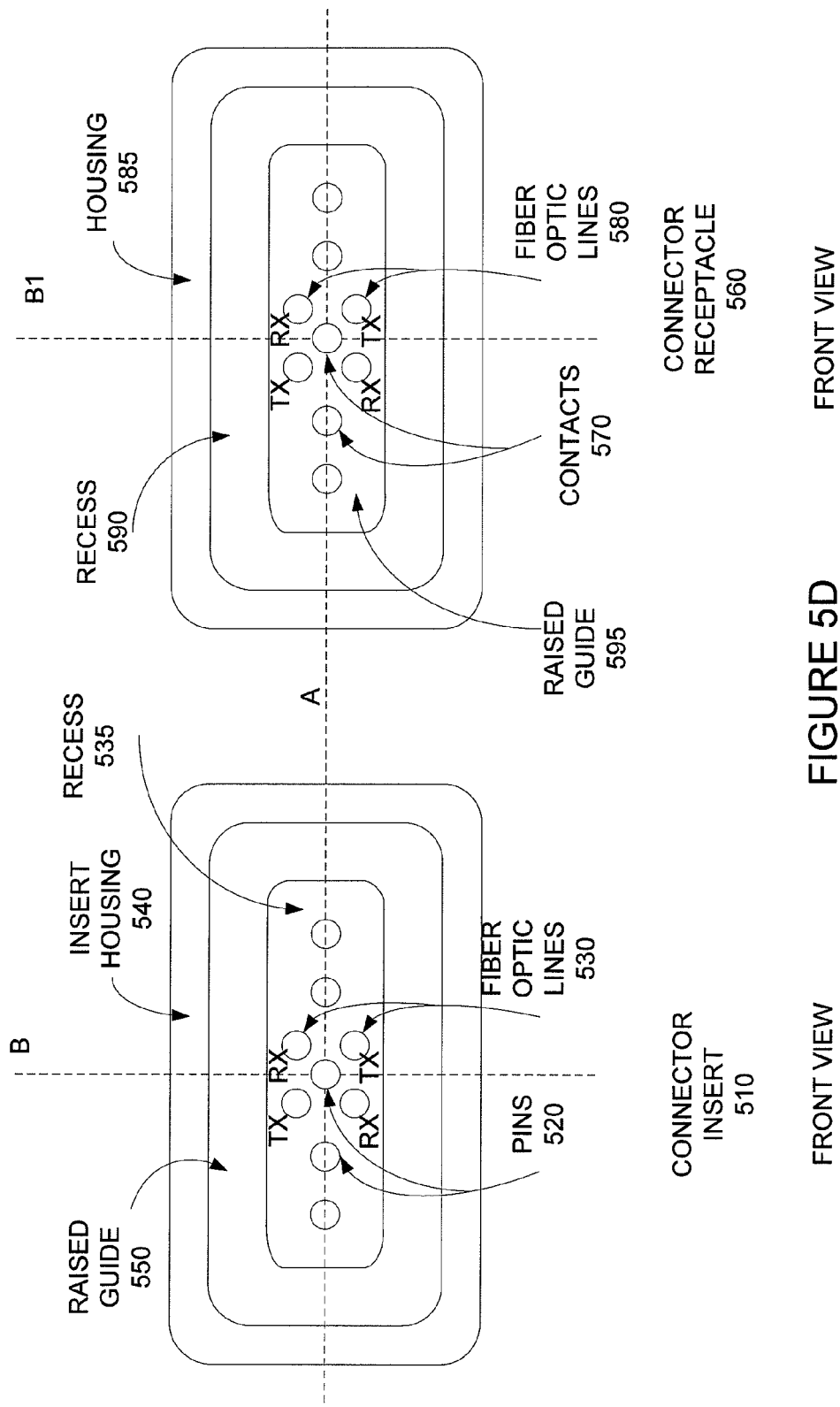

FIG. 5D illustrates front views of a connector insert and a connector receptacle according to another embodiment of the present invention. The connector insert 510 in this example includes four fiber-optic lines 530. As before, two lines are used for transmitting and two are used for receiving. An additional pin, which may be a signal or a power pin, is placed in the center of the four fiber optic lines. This allows backward compatibility with currently available connectors and receptacles that are discussed in U.S. Pat. No. 7,311,526, which is incorporated by reference. Again, since the four fiber-optic lines are rotationally symmetrical the connector insert 510 may be inserted into the connector receptacle 560 in either the right-side up or upside down positions. The additional pin show may be included in the other examples above, and in other connector systems according to embodiments of the present invention.

Figure 6A:
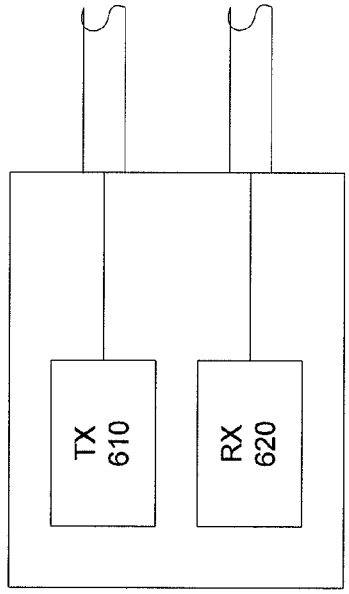
FIGS. 6A-6C illustrate transmit and receive circuitry employed by connector systems according to embodiments of the present invention.
Figure 6B:
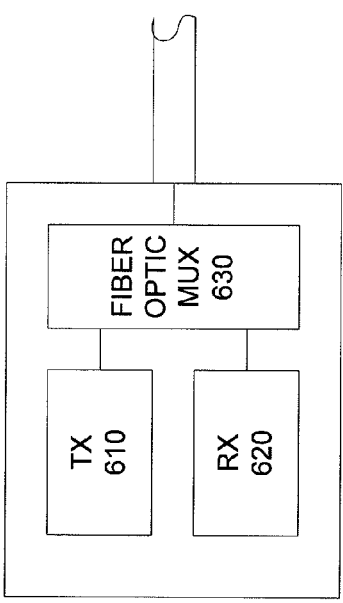
Figure 6C:
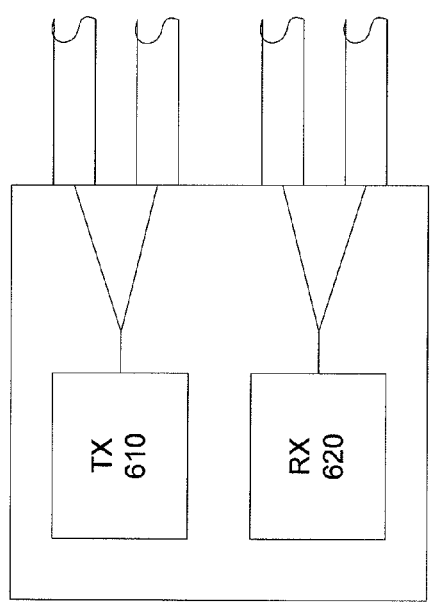

FIGS. 6A-6C illustrate transmit and receive circuitry employed by connector systems according to embodiments of the present invention. In FIG. 6A, only one fiber-optic cable is used, such as in the example shown in FIG. 5A. In this case, data provided by transmitter 610 and received by receiver 620 is multiplexed over a fiber-optic multiplexer 630. That is, when transmitter 610 transmits data, transmitter 610 provides data to the fiber-optic multiplexer 630, which provides it over the fiber-optic line. Data received over the fiber-optic line is multiplexed by the fiber-optic multiplexer 630 and provided to the receiver 620. In FIG. 6B, two fiber-optic cables are used, such as in the example of FIG. 5B. In this case, the transmitter 610 and receiver 620 each have their own fiber-optic cable, so no multiplexing is required. In FIG. 6C, the transmitter 610 and receiver 620 each have two fiber-optic cables. Accordingly, a fiber-optic cable from the transmitter 610 is split. Similarly, the fiber-optic cable to the receiver 620 is split.

FIG. 7 illustrates a top view of a connector insert 710 and connector receptacle 760 according to an embodiment of the present invention. Connector insert 710 includes a number of pins 720 and a fiber-optic line 730. A raised guide 750 surrounds the pins 720 and fiber-optic line 730. When the connector insert 710 is mated with the connector receptacle 760, the raised guide 750 is arranged to fit into the recess 790 in the connector receptacle 760. Similarly, the raised guide 795 on the connector receptacle 760 fits in the recess 735 of the connector insert 710. The pins 720 are arranged to contact the contacts 770 and make electrical connections. In order to ensure proper contact, the pins 720 may be biased, for example by a spring. The fiber-optic line 730 comes in close proximity with the fiber-optic line 780 in the connector receptacle 760 in order to form a fiber-optic connection. In this example, the fiber-optic connection reliability is enhanced by the use of lenses 732 and 782. In other embodiments of the present invention, lenses are not used, rather the close proximity of the fiber-optic lines is relied upon.

In various embodiments of the present invention, a fiber-optic line in the connector insert transfers data with a fiber-optic line in the connector receptacle. Successful transfers of data rely on the fiber-optic lines being in close proximity. This transfer can be aided by the use of a lens as shown above.

Again, to improve reliability, lenses may be used to focus light provided and received by the fiber-optic lines. In other embodiments of the present invention, other devices such as collectors may be used. These collectors may be rounded, flat, or other shaped mirrors or reflectors to gather light provided by a fiber-optic line. Examples of these techniques are shown in the following figures.

Figure 8:
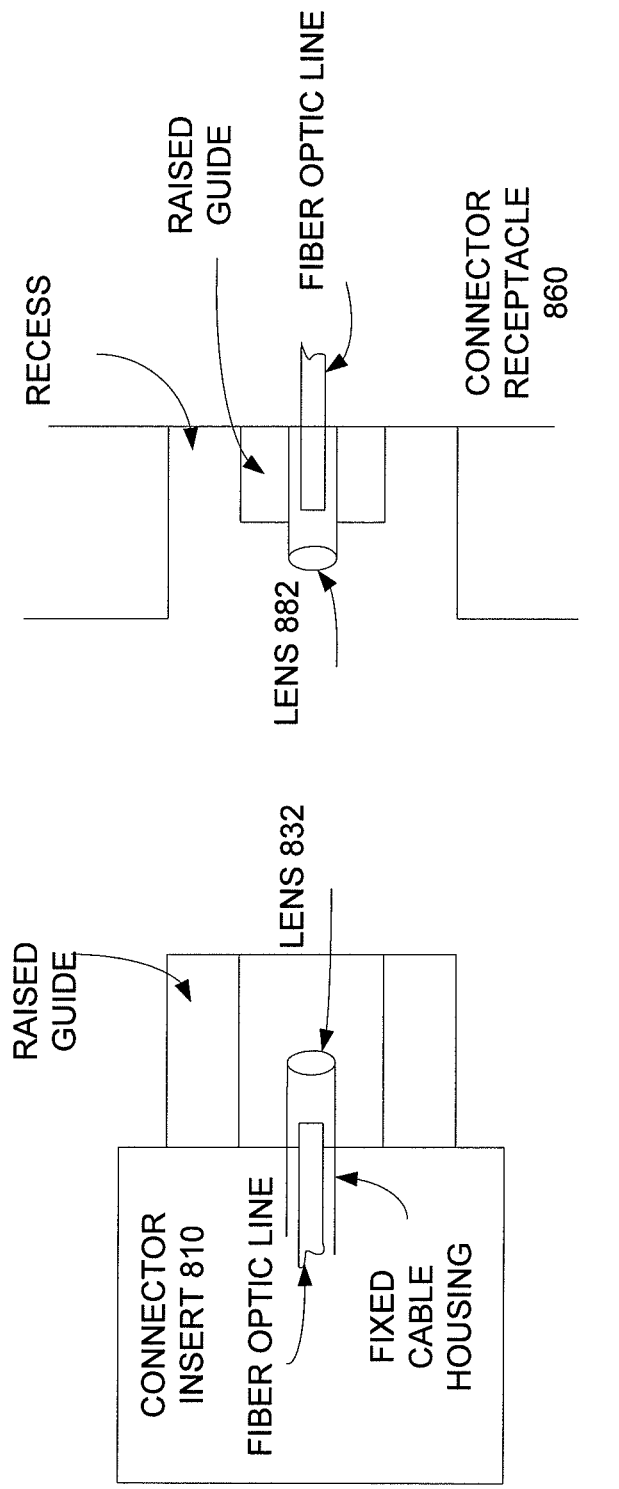
FIG. 8 illustrates a side view of a connector insert and connector receptacle according to an embodiment of the present invention.
Figure 9:
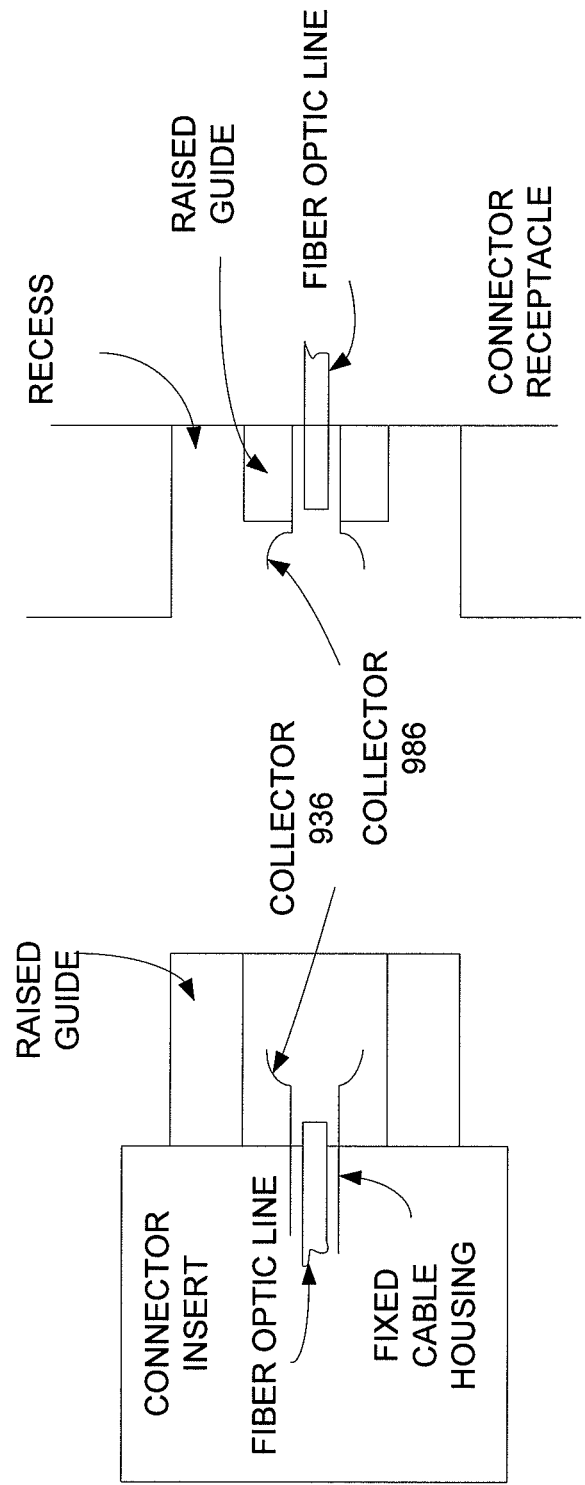
FIG. 9 illustrates a side view of another connector insert and connector receptacle according to an embodiment of the present invention.

FIGS. 8 and 9 illustrate side views of a connector insert and connector receptacle according to an embodiment of the present invention. In FIG. 8, lenses 832 and 882 are used to improve the fiber-optic signal between fiber-optic lines 830 and 880. These lenses focus light emitted and received by their corresponding fiber-optic line for improved reception In FIG. 9, collectors 936 and 986 are used to gather light received by their corresponding fiber-optic line to improve the signal reliability between fiber-optic lines 930 and 980.

In the above examples, only one fiber-optic line is shown for simplicity. In other embodiments of the present invention, two, three, four, or more fiber-optic lines may be used. Also in the above examples, the connector insert and connector receptacle each have five locations, where four locations are electrical connections and one location is for an optical data connection. Another embodiment of the present invention, other arrangements are possible. In some of these arrangements, two pins are used for power, while two are used for ground. Various arrangements that may be employed by an embodiment of the present invention are shown in the following figure.

Figure 10:
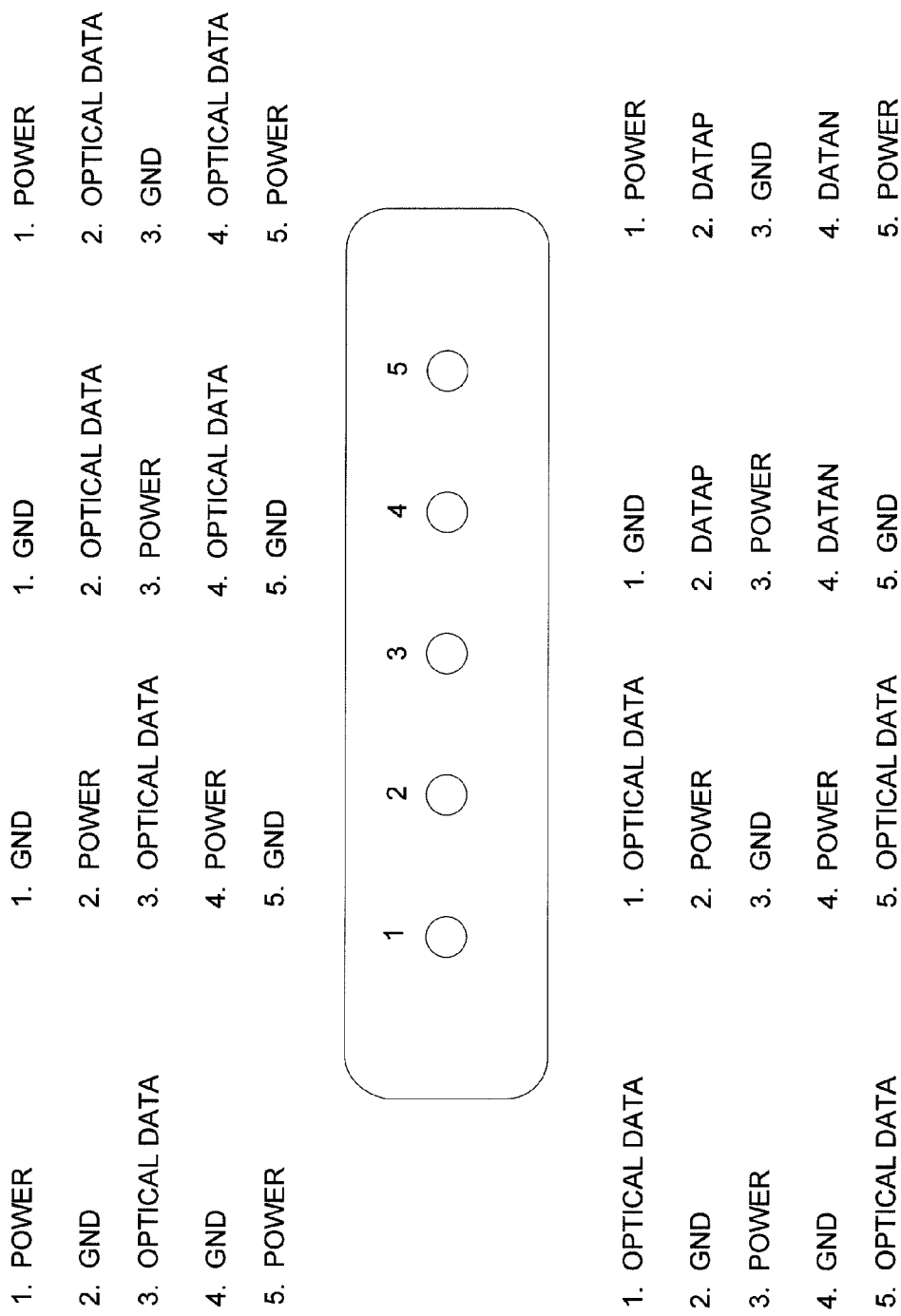
FIG. 10 illustrates electrical pin and fiber-optical line positions of a connector insert according to embodiment of the present invention.

FIG. 10 illustrates electrical pin and fiber-optical line positions of a connector insert according to embodiment of the present invention. In some of these examples, two pins are used for power, while two are used for ground. Often, the central location is used for optical data. This allows a connector insert to be inserted in one of two ways along a central line of symmetry, as discussed above. In other examples, two of the five locations may be used for optical data lines. In still other embodiments of the present invention, either more or fewer than five locations may be used.

It can be undesirable for connector insert pins to be supplied with power when the connector insert is not inserted into a connector receptacle. In such a case, inadvertent currents may flow between pins of the connector insert when the connector insert comes in contact with a conductor of some sort, such as a paper clip. Having power applied to the connector insert when the connector insert is not located in the connector receptacle is particularly undesirable when there are magnets located in the connector insert, since these magnets may attract conductive materials. Accordingly, embodiments of the present invention determine whether a connector insert is inserted into a connector receptacle before applying power to the connector insert. Examples of this are shown in the following figures.

Figure 11:
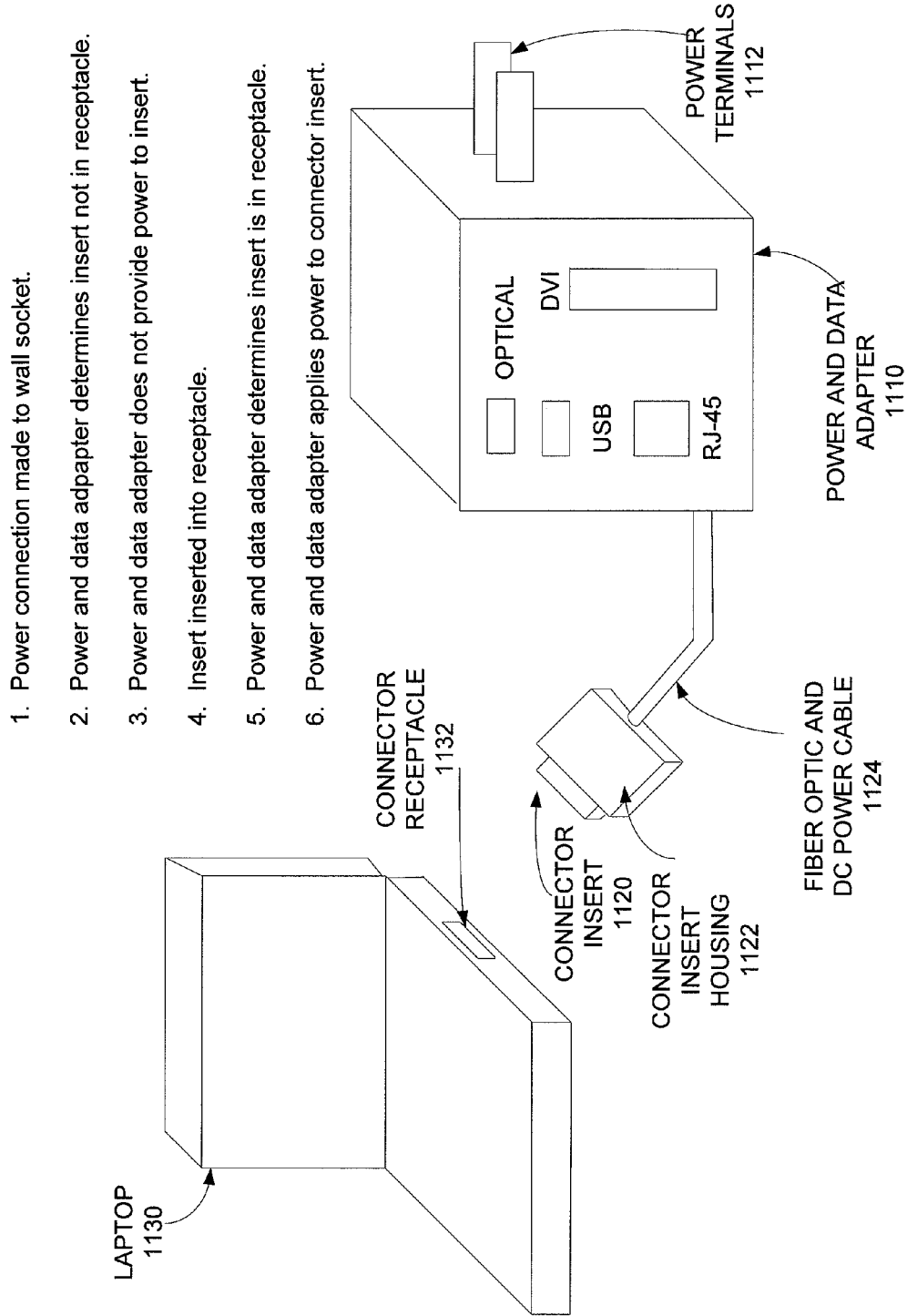
FIG. 11 illustrates a power and data transfer system according to an embodiment of the present invention.

FIG. 11 illustrates a power and data transfer system according to an embodiment of the present invention. The power and data adapter 1110 in this example does not apply power to a connector insert until the connector insert is seated in a connector receptacle. In this example, a power connection is made to a wall outlet or sockets using power terminals 1112. The power and data adapter 1110 determines that connector insert 1120 is not seated in the connector receptacle 1132.

Accordingly, the power and data adapter 1110 does not provide power to the connector insert 1120. At some point, the connector insert 1120 is inserted into the connector receptacle 1132. Afterwards, the power and data adapter 1110 determines that the connector insert 1120 is located in the connector receptacle 1132. The power and data adapter 1110 then applies power to the connector insert 1120.

Figure 12:
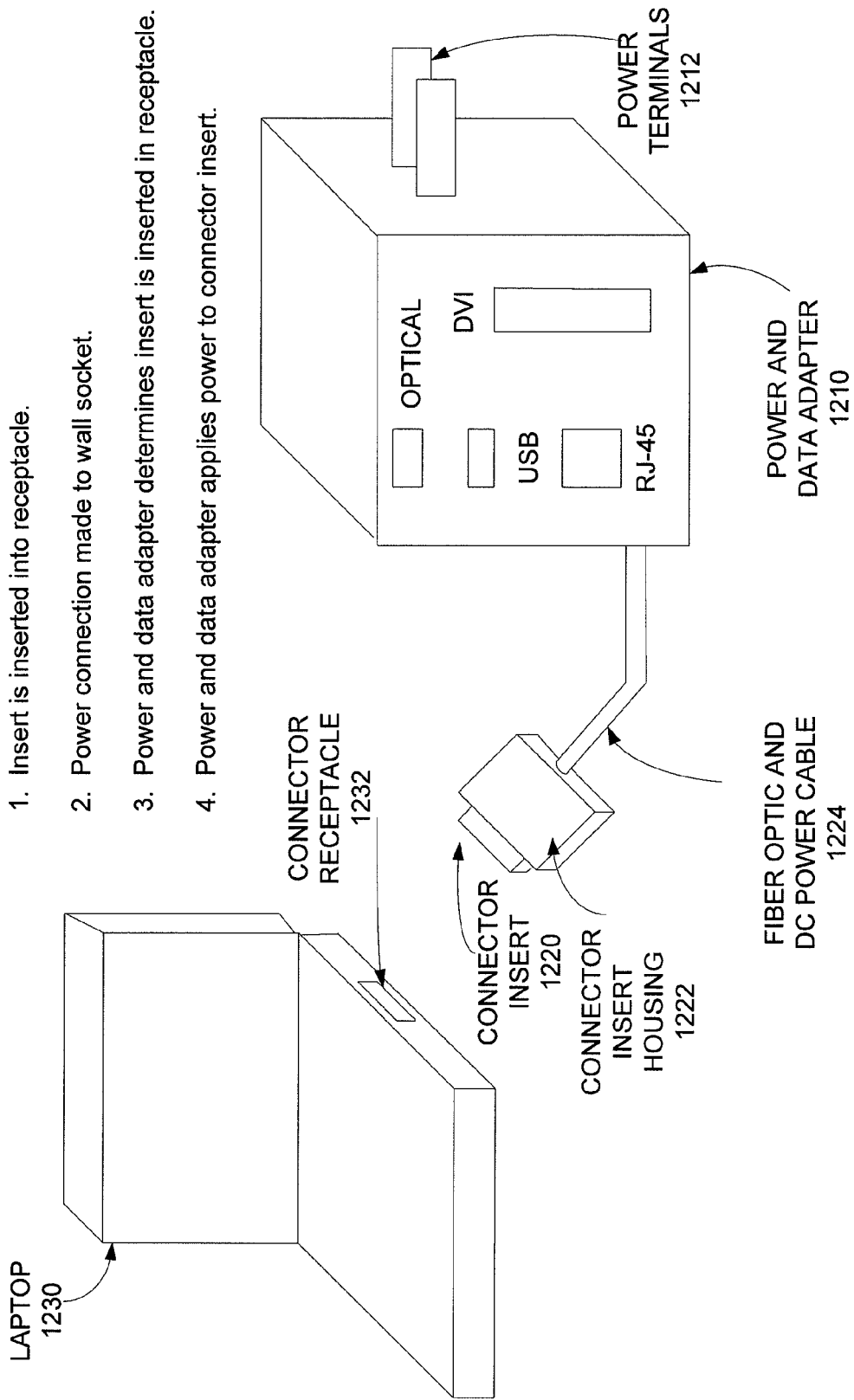
FIG. 12 illustrates another power and data transfer system according to an embodiment of the present invention.

FIG. 12 illustrates another power and data transfer system according to an embodiment of the present invention. The power and data adapter 1210 in this system does not apply power to a connector insert until it is seated in a connector receptacle. In this example, the connector insert 1220 is inserted into the connector receptacle 1232. After this, a power connection for the power and data adapter 1210 is made to a wall socket, for example, using power terminals 1212. The power and data adapter 1210 determines that the connector insert 1220 is inserted into the connector receptacle 1232. Accordingly, the power and data adapter 1210 applies power to the connector insert 1220. A flowchart outlining this is shown in the following figure.

Figure 13:
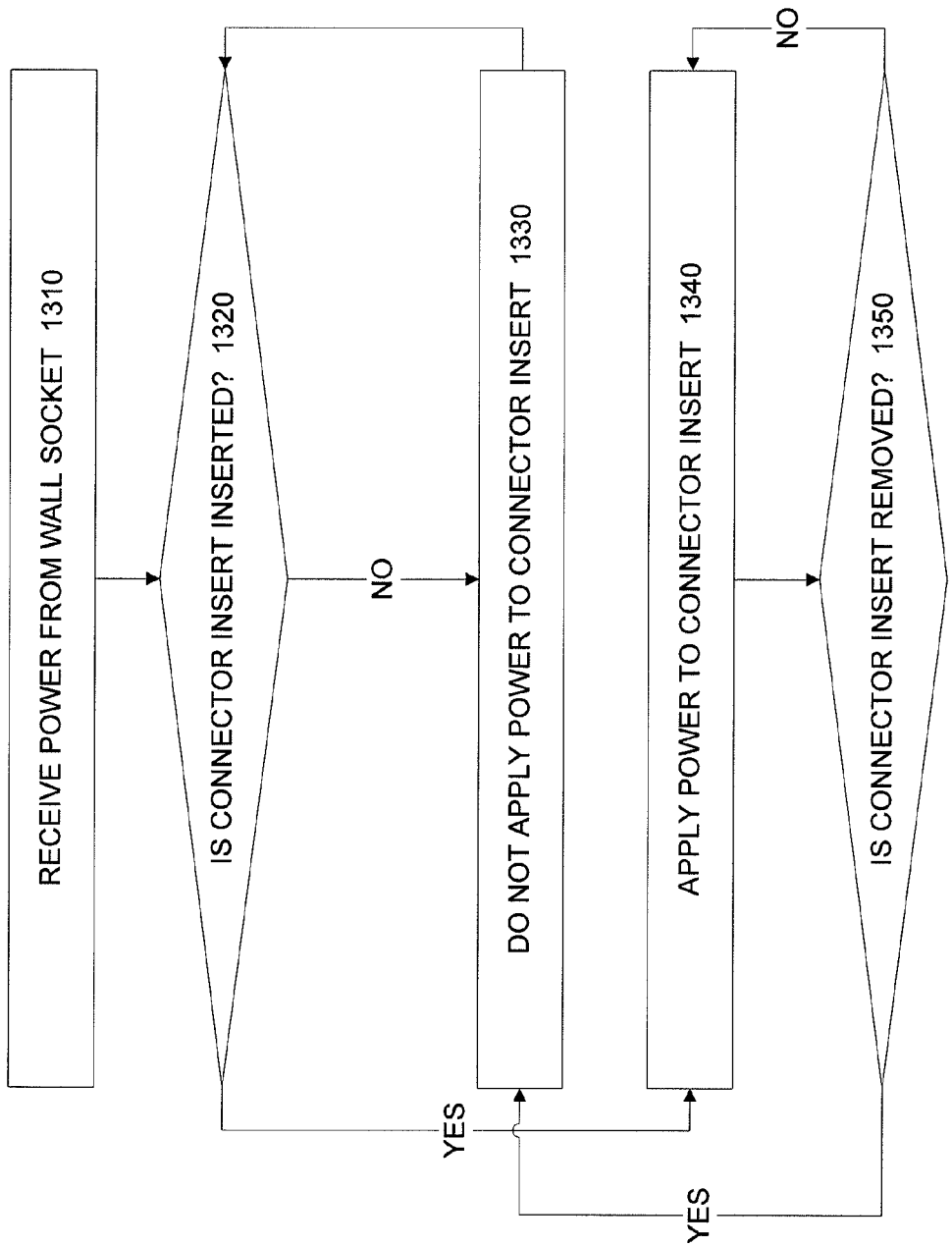
FIG. 13 illustrates a method of applying power to a connector according to an embodiment of the present invention.

FIG. 13 illustrates a method of applying power to a connector according to an embodiment of the present invention. In act 1310, power is received from a wall socket. In act 1320, it is determined whether a connector insert has been inserted into a connector receptacle. If it is not, power is not applied to the connector insert in act 1330. If the power and data adapter determines that the connector insert has been inserted into a connector receptacle, power is applied to the connector insert in act 1340. In act 1350, it is determined whether the connector insert has been removed. If it has not been removed, power continues to be applied to the connector insert in act 1340. If the connector insert has been removed, then power is not applied to the connector insert in act 1330.

In various embodiments of the present invention, a determination that the connector insert has been inserted into a connector receptacle may be made by providing a sense current between the power and ground pins of the connector insert. If a voltage in a specific range is measured, power can then be applied to the connector insert. Optionally at this time, the device attached to the connector receptacle can receive, provide, or trade identification information with a power and data adapter. Example circuitry that may be employed by a power and data adapter to accomplish this is shown in the following figure.

Figure 14:
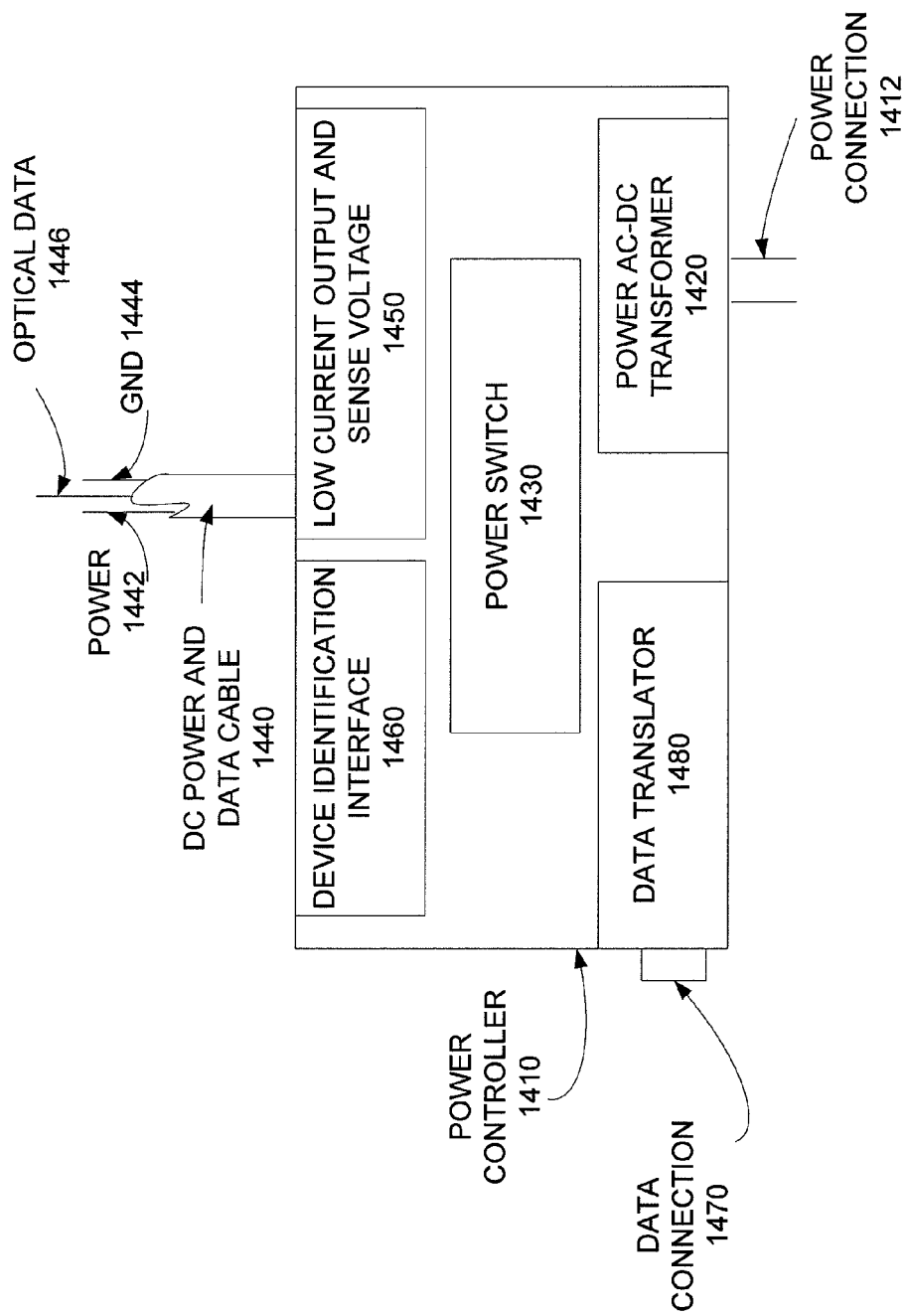
FIG. 14 illustrates circuitry in a power and data adapter according to an embodiment of the present invention.

FIG. 14 illustrates circuitry in a power and data adapter according to an embodiment of the present invention. The power and data adapter 1410 includes a power connection 1412, that may be, for example, prongs that are arranged to be inserted into a wall outlet. The prongs may rotate between two positions: a first position extended from the power and data adapter such that they may be inserted into a wall outlet, and a second position where they are not extended to save space. The power and data adapter 1410 further includes a transformer and rectifier circuit 1420 to convert the AC power received to the power connection to DC power that is provided to the power switch 1430. The power switch 1430 determines whether power should be applied to the power lines 1432 in the DC power and data cable 1440. Initially, the low current output and voltage sense circuit 1450 provides a small current between power and ground pins of a connector insert (not shown.) If a resulting voltage in the proper range is detected, power switch 1430 applies power between the power line 1442 and ground line 1444. Following that, device identification can be received, provided, or traded over the optical data lines 1446 using the device identification interface circuitry 1460.

Figure 15:
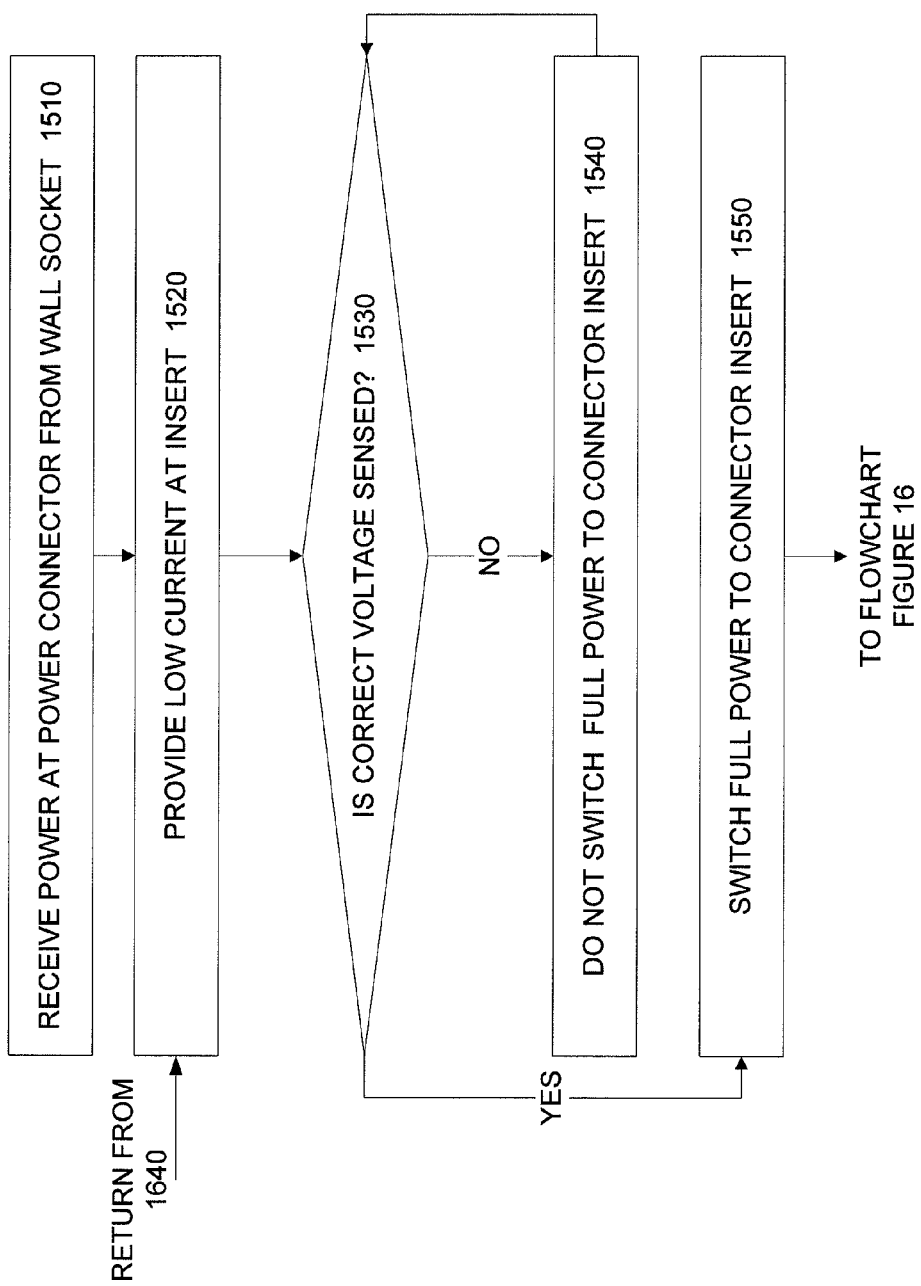

FIGS. 15 and 16 illustrate the operation of the circuitry in FIG. 14. In act 1510, power is received at a power connection from a wall socket or other source. A low current is provided at an insert in act 1520. For example, a low current may be provided between the power and ground pins of a connector insert. In act 1530, a resulting voltage is measure, and it is determined whether the resulting voltage is in a specific range. If it is not in the specific range, then power is not switched to the connector insert in act 1540. If a correct voltage is sensed, full power may be switched to the connector insert in act 1550.

In act 1620, identification data may be sent by the power and data adapter. In act 1630, it is determined whether proper identification data is returned. If it is not, power is removed from the connector insert in act 1640. At this point, a low current is again provided in act 1520. If a proper identification is received in act 1630, then power is maintained in the connector insert in act 1650. This identification data can be checked periodically in act 1660. If the data is received, power is maintained in act 1650. Once the data is no longer periodically received, the power is removed from the connector insert in act 1640, and again a low current is provided in act 1520.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A connector system comprising:
a first connector comprising:
a first surface, the first surface being symmetrical about a first axis and symmetrical about a second axis perpendicular to the first axis; the first axis and the second axis being perpendicular to a connection axis of the first surface;
an attraction plate extending from the first surface;
a first pin to provide an electrical connection for a first power supply voltage, the first pin extending from the first surface and aligned with the first axis and spaced a first distance away from the second axis;
a second pin to provide an electrical connection for the first power supply voltage, the second pin extending from the first surface and aligned with the first axis and spaced the first distance away from the second axis opposite the first pin such that the first pin and the second pin are symmetrical about the second axis;
a third pin to provide an optical connection to receive data;
a fourth pin to provide an optical connection to transmit data, the third pin and the fourth pin located between the first pin and the second pin;
a fifth pin to provide an electrical connection for a second power supply, the fifth pin extending from the first surface and aligned with the first axis and spaced a second distance away from the second axis, and
a sixth pin to provide an electrical connection for the second power supply, the sixth pin extending from the first surface and aligned with the first axis and spaced the second distance away from the second axis opposite the fifth pin such that the fifth pin and the sixth pin are symmetrical about the second axis, wherein the attraction plate is located around the first pin, the second pin, the third pin, the fourth pin, the fifth pin, and the sixth pin.

2. The connector system of claim 1 wherein the first power supply voltage is a positive supply voltage.

3. The connector system of claim 1 further comprising a fifth pin to provide an electrical connection for a second power supply voltage and a sixth pin to provide an electrical connection for the second power supply voltage, wherein the second power supply voltage is ground.

4. The connector system of claim 1 further comprising a shield for the third pin to improve the optical connection.

5. The connector system of claim 1 further comprising a lens for the third pin to improve the optical connection.

6. The connector system of claim 1 further comprising:
a second connector to couple with the first connector, the second connector comprising:
a first pin to provide an electrical connection for the first power supply voltage;
a second pin to provide an electrical connection for the first power supply voltage;
a third pin to provide an optical connection to receive data; and
a fourth pin to provide an optical connection to transmit data.

7. The connector system of claim 1 wherein the attraction plate comprises a ferro-magnetic material and the second connector comprises a magnet, where the magnet is attracted to the attraction plate such that the second connector is magnetically held to the first connector when the second connector and first connector are coupled.

8. The connector system of claim 7 wherein the second connector comprises a plurality of magnets having opposing polarities relative to each other, such that when the first connector is brought in close proximity to the second connector, magnetic field lines travel through the attraction plate of the second connector from one of the plurality of magnets in the first connector to another one of the plurality of magnets in the first connector, thereby increasing magnetic attraction between the first connector and the second connector.

9. The connector system of claim 1 wherein the first connector comprises an first magnet and the second connector comprises a second magnet, where the first magnet is attracted to the second magnet such that the second connector is magnetically held to the first connector when the second connector and first connector are coupled.

10. The connector system of claim 1 further comprising:
a seventh pin to provide an optical connection to transmit data; and
a eighth pin to provide an optical connection to receive data.

11. The connector system of claim 1 wherein the second distance is longer than the first distance.

12. A power and data adapter comprising:
a first port for receiving a first power supply;
a second port for a data connection; and
a third port for providing a second power supply, a ground, and optical data and for receiving optical data;
a cable coupled to the third port having a first conductor for the second power supply, a second conductor for ground, a first fiber optic cable for providing optical data, and a second fiber optic cable for receiving optical data; and
a connector coupled to the cable, the connector comprising:
a first surface, the first surface being symmetrical about a first axis and symmetrical about a second axis perpendicular to the first axis; the first axis and the second axis being perpendicular to a connection axis of the first surface;

an attraction plate extending from the first surface;

a first pin to provide an electrical connection for a first power supply voltage, the first pin extending from the first surface and aligned with the first axis and spaced a first distance away from the second axis;

a second pin to provide an electrical connection for the first power supply voltage, the second pin extending from the first surface and aligned with the first axis and spaced the first distance away from the second axis opposite the first pin such that the first pin and the second pin are symmetrical about the second axis;

a third pin to provide an optical connection to receive data;

a fourth pin to provide an optical connection to transmit data, the third pin and the fourth pin located between the first pin and the second pin;

a fifth pin to provide an electrical connection for a second power supply, the fifth pin extending from the first surface and aligned with the first axis and spaced a second distance away from the second axis, and a sixth pin to provide an electrical connection for the second power supply, the sixth pin extending from the first surface and aligned with the first axis and spaced the second distance away from the second axis opposite the fifth pin such that the fifth pin and the sixth pin are symmetrical about the second axis, wherein the attraction plate is located around the first pin, the second pin, the third pin, and the fourth pin, the fifth pin, and the sixth pin.

13. The power and data adapter of claim 12 wherein the first power supply is an AC power supply received from a wall outlet.

14. The power and data adapter of claim 12 wherein the first power supply is a DC power supply received from a car outlet.

15. The power and data adapter of claim 12 wherein the data connection is a Universal Serial Bus connection.

16. The power and data adapter of claim 12 wherein the data connection is a Local Area Network connection.

17. The power and data adapter of claim 12 wherein the data connection is a Digital Visual Interface connection.

18. The power and data adapter of claim 12 further comprising:

first circuitry for converting data received at the data connection to optical data.

19. The power and data adapter of claim 18 further comprising:

second circuitry for converting the first power supply to the second power supply.

* * * * *